United States Patent
Liu et al.

(10) Patent No.: US 12,342,349 B2
(45) Date of Patent: Jun. 24, 2025

(54) INFORMATION GENERATION METHOD, DEVICE, AND STORAGE MEDIUM

(71) Applicant: ZTE CORPORATION, Shenzhen (CN)

(72) Inventors: Xing Liu, Shenzhen (CN); Peng Hao, Shenzhen (CN); Xingguang Wei, Shenzhen (CN); Jing Shi, Shenzhen (CN); Wei Gou, Shenzhen (CN); Shuaihua Kou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 251 days.

(21) Appl. No.: 17/792,108

(22) PCT Filed: Feb. 4, 2021

(86) PCT No.: PCT/CN2021/075187
§ 371 (c)(1),
(2) Date: Jul. 11, 2022

(87) PCT Pub. No.: WO2021/160009
PCT Pub. Date: Aug. 19, 2021

(65) Prior Publication Data
US 2023/0038293 A1 Feb. 9, 2023

(30) Foreign Application Priority Data
Feb. 11, 2020 (CN) .......................... 202010087276.3

(51) Int. Cl.
*H04W 72/23* (2023.01)
*H04L 5/00* (2006.01)

(52) U.S. Cl.
CPC .......... *H04W 72/23* (2023.01); *H04L 5/0055* (2013.01)

(58) Field of Classification Search
CPC .............................. H04W 72/23; H04L 5/0055
See application file for complete search history.

(56) References Cited

U.S. PATENT DOCUMENTS

| | | | |
|---|---|---|---|
| 12,069,655 B2 * | 8/2024 | Zhang | .................. H04L 1/1812 |
| 12,177,028 B2 * | 12/2024 | Li | ........................ H04L 1/1861 |
| 2018/0241510 A1 * | 8/2018 | Shen | ........................ H04L 1/18 |

(Continued)

FOREIGN PATENT DOCUMENTS

| | | |
|---|---|---|
| CN | 107820687 A | 3/2018 |
| CN | 109586877 A | 4/2019 |

(Continued)

OTHER PUBLICATIONS

Extended European Search Report of Application No. 21753376.9, dated Nov. 22, 2023, 8 pages.

(Continued)

*Primary Examiner* — Michael J Moore, Jr.
(74) *Attorney, Agent, or Firm* — Morgan, Lewis & Bockius LLP

(57) ABSTRACT

Provided are an information generation method, a device, and a storage medium. The method includes: receiving a DCI sent by a second communication node, where the DCI is used for scheduling at least one PDSCH; and generating a corresponding feedback codebook according to a C-DAI value and a T-DAI value which are contained in a DAI indicator field in the DCI.

19 Claims, 11 Drawing Sheets

(56) References Cited

U.S. PATENT DOCUMENTS

| | | | |
|---|---|---|---|
| 2018/0323907 A1 | 11/2018 | Takeda et al. | |
| 2020/0358562 A1* | 11/2020 | Peng | H04W 24/08 |
| 2021/0075558 A1* | 3/2021 | Takeda | H04W 72/23 |
| 2021/0105102 A1* | 4/2021 | Li | H04L 1/1896 |
| 2021/0234643 A1* | 7/2021 | Wang | H04L 1/1887 |
| 2021/0329682 A1* | 10/2021 | Takeda | H04W 72/0446 |
| 2022/0078827 A1* | 3/2022 | Zhang | H04L 1/1854 |
| 2022/0201728 A1* | 6/2022 | Lin | H04W 72/1273 |
| 2022/0225390 A1* | 7/2022 | Harada | H04L 1/1685 |
| 2022/0232602 A1* | 7/2022 | Liang | H04L 5/0053 |
| 2022/0278807 A1* | 9/2022 | Zhang | H04L 1/1887 |
| 2022/0361211 A1* | 11/2022 | Karaki | H04L 1/1685 |
| 2022/0393801 A1* | 12/2022 | Lei | H04L 1/1812 |
| 2022/0399960 A1* | 12/2022 | Bae | H04L 5/00 |
| 2023/0030642 A1* | 2/2023 | Yuan | H04L 1/1822 |
| 2023/0038293 A1* | 2/2023 | Liu | H04L 5/0055 |
| 2024/0048289 A1* | 2/2024 | Takahashi | H04L 1/1861 |
| 2024/0048335 A1* | 2/2024 | Wei | H04L 1/1861 |
| 2024/0073887 A1* | 2/2024 | Bae | H04W 72/535 |

FOREIGN PATENT DOCUMENTS

| | | |
|---|---|---|
| CN | 109639398 A | 4/2019 |
| CN | 110535573 A | 12/2019 |
| CN | 110557233 A | 12/2019 |
| CN | 111901886 A | 11/2020 |
| WO | WO-2017078159 A1 | 5/2017 |
| WO | WO-2018175820 A1 | 9/2018 |
| WO | WO2019144833 A1 | 8/2019 |
| WO | WO-2020026292 A1 | 2/2020 |

OTHER PUBLICATIONS

MediaTek Inc., "Enhancements to HARQ for NR-U operation," 3GPP TSG RAN WG1 Ad-Hoc Meeting 1901, R1-1900188, Taipei, Taiwan Jan. 21-25, 2019, 10 pages.

International Search Report for Application No. PCT/CN2021/075187, dated Apr. 29, 2021, 4 pages including English translation.

Office Action of Japanese Application No. 2022-543150, dated May 9, 2023, 6 pages including translation.

WILUS Inc., "Remaining Issues on UCI enhancement for NR URLLC," 3GPP TSG RAN WG1 #99, R1-1913068, Reno, USA, Nov. 18-22, 2019, 7 pages.

Chinese Search Report in Application No. 202010087276.3, dated Jun. 12, 2024, 6 pages including translation.

Chinese Office Action in Application No. 202010087276.3, dated Jun. 14, 2024, 10 pages including translation.

Office Action in Korean Application No. 10-2022-7030523, dated Jan. 13, 2025, 18 pages, including translation.

NTT Docomo, Inc., "Enhancements on multi-TRP/panel transmission", 3GPP TSG RAN WG1 #98, R1-1909201, Prague, CZ, Aug. 26-30, 2019.

* cited by examiner

INFORMATION GENERATION METHOD, DEVICE, AND STORAGE MEDIUM

CROSS-REFERENCES TO RELATED APPLICATIONS

This application is a national stage application filed under 35 U.S.C. 371 based on International Patent Application No. PCT/CN2021/075187, filed on Feb. 4, 2021, which claims priority to Chinese Patent Application No. 202010087276.3 filed with the China National Intellectual Property Administration (CNIPA) on Feb. 11, 2020, the disclosures of which are incorporated herein by reference in their entireties.

TECHNICAL FIELD

The present application relates to communication and, in particular, relates to an information generation method, a device, and a storage medium.

BACKGROUND

In Release 17 (R17) of the New Radio (NR or New RAT) system, it may be supported that one downlink control information (DCI) is used for scheduling multiple physical downlink shared channels (PDSCHs). However, in the case where the DCI schedules the multiple PDSCHs, how to design a downlink assignment index (DAI) indicator field in the DCI and how to generate a feedback codebook become urgent problems to be solved.

SUMMARY

Embodiments of the present application provide an information generation method, a device, and a storage medium, which effectively implements the design of a DAI indicator field and the generation of a feedback codebook in the case where one DCI schedules multiple PDSCHs.

Embodiments of the present application provide an information generation method. The method is applied to a first communication node and includes steps described below.

A downlink control information (DCI) sent by a second communication node is received, where the DCI is used for scheduling at least one physical downlink shared channel (PDSCH).

A corresponding feedback codebook is generated according to a counter downlink assignment index (C-DAI) value and a total downlink assignment index (T-DAI) value which are contained in a downlink assignment index (DAI) indicator field in the DCI.

Embodiments of the present application provide an information generation method. The method is applied to a second communication node and includes steps described below.

A downlink control information (DCI) is sent to a first communication node, where the DCI is used for scheduling at least one physical downlink shared channel (PDSCH).

The DCI is further used for causing the first communication node to generate a corresponding feedback codebook according to a counter downlink assignment index (C-DAI) value and a total downlink assignment index (T-DAI) value which are contained in a downlink assignment index (DAI) indicator field in the DCI.

Embodiments of the present application provide a device which includes a memory and one or more processors.

The memory is configured to store one or more programs.

When executing the one or more programs, the one or more processors implement the method according to any embodiment described above.

Embodiments of the present application provide a storage medium. The storage medium is configured to store a computer program which, when executed by a processor, implements the method according to any embodiment described above.

DETAILED DESCRIPTION

Figure 1:
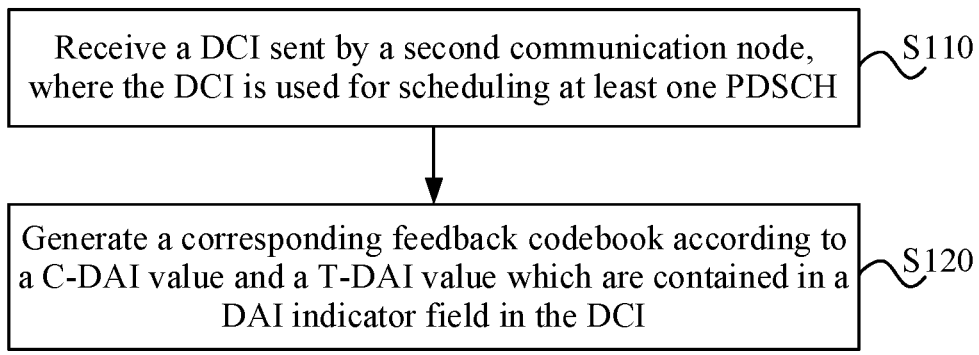
FIG. 1 is a flowchart of an information generation method according to an embodiment of the present application.

Embodiments of the present application are described below in conjunction with the drawings.

In a traditional system, one downlink control information (DCI) schedules one physical downlink shared channel (PDSCH) which may carry one or two transmission blocks (TBs) or multiple code block groups (CBGs). A terminal performs feedback based on the TBs or the CBGs, and multiple feedback bits of one terminal correspond to the same uplink feedback. In this case, the multiple feedback bits may be aggregated into a feedback codebook and carried on an uplink feedback resource (which may be a physical uplink control channel (PUCCH) or a physical uplink shared channel (PUSCH)) to be sent to a base station. The feedback codebook is generated in two manners.

One is a semi-static codebook, that is, a downlink transmission resource corresponding to an uplink feedback resource occupies feedback bits no matter whether the base station schedules a PDSCH of the terminal, so as to prevent the terminal and the base station from having different understandings of "a size of a feedback codebook" and "a corresponding relationship between bits in the feedback codebook and downlink data". It is apparent that a problem exists that feedback bits are wasted in the semi-static feedback codebook, that is, in this codebook generation manner, since some downlink transmission resources do not schedule the PDSCH of the terminal, feedback bits for these downlink transmission resources are useless.

The other one is a dynamic codebook, where a DAI indicator field is introduced into a DCI and includes two types: a counter downlink assignment index (C-DAI) value and a total counter downlink assignment index (T-DAI) value. The C-DAI value is used for indicating the number of PDSCHs which are scheduled up to a current DCI and need to be fed back in the same feedback codebook, where the terminal may determine, according to the C-DAI value, positions of feedback bits corresponding to downlink data scheduled by the DCI in the feedback codebook; and the T-DAI value is used for indicating the total number of PDSCHs which are scheduled up to a current monitoring occasion (MO) of a physical downlink control channel (PDCCH) and need to be fed back in the same feedback codebook. In a non-carrier aggregation mode, only the C-DAI indicator field may be contained in the DCI. In this codebook generation manner, downlink data fed back on the same feedback resource are counted so that each bit in the feedback codebook corresponds to downlink data actually scheduled, thereby effectively saving feedback overheads. However, the induction of the DAI indicator field also increases overheads of the DCI.

In Release 17 (R17) of the New Radio (NR or New RAT) system, some new technical features are introduced for the scheduling of the downlink data and include that one DCI is used for scheduling multiple PDSCHs. In this case, how to design a DAI indicator field in the DCI and how to generate a feedback codebook become urgent problems to be solved.

In view of this, the embodiments of the present application provide an information generation method, so as to implement, in R17 of the NR system, the design of the DAI indicator field and the generation of the feedback codebook in the case where the one DCI schedules the multiple PDSCHs.

In an embodiment, FIG. 1 is a flowchart of an information generation method according to an embodiment of the present application. As shown in FIG. 1, this embodiment is applied to a first communication node. For example, the first communication bode may be a user equipment (UE) or may also be referred to as a terminal. This embodiment includes S110 and S120.

In S110, DCI sent by a second communication node is received, where the DCI is used for scheduling at least one PDSCH.

In the embodiment, the second communication node refers to a node communicatively connected to the first communication node. For example, the second communication node may be a base station. In an embodiment, the DCI may include a first-type DCI and a second-type DCI, where the first-type DCI is used for scheduling at least two PDSCHs and the second-type DCI is used for scheduling one PDSCH. During the communication between the first communication node and the second communication node, the second communication node sends the DCI to the first communication node.

In S120, a corresponding feedback codebook is generated according to a C-DAI value and a T-DAI value which are contained in a DAI indicator field in the DCI.

In the embodiment, the DAI indicator field may be contained in the DCI, and the C-DAI value and the T-DAI value may be contained in the DAI indicator field. The C-DAI value is used for indicating the number of PDSCHs which are scheduled up to a current DCI and need to be fed back in the same feedback codebook; and the T-DAI value is used for indicating the total number of PDSCHs which are scheduled up to a current PDCCH monitoring occasion (MO) and need to be fed back in the same feedback codebook. For example, the number of the PDSCHs which are scheduled up to the current DCI and need to be fed back in the same feedback codebook is 3, and the number of the PDSCHs which are scheduled up to the PDCCH current monitoring occasion and need to be fed back in the same feedback codebook is 10. Then, the C-DAI value and the T-DAI value are 3 and 10, respectively. In this embodiment, the multiple PDSCHs are regulated to share the C-DAI value and the T-DAI value in the DCI and the corresponding feedback codebook is generated, thereby saving bit overheads in the one DCI which schedules the multiple PDSCHs on the premise that it is ensured that the first communication node and the second communication node have no ambiguity in understanding a bit order in the feedback codebook and a size of the feedback codebook.

In an embodiment, in the case where the DCI is the first-type DCI and only one group of C-DAI values and T-DAI values are contained in the first-type DCI, a C-DAI value counting rule includes that a carrier where one of PDSCHs scheduled by the first-type DCI is located is used as a reference carrier and counting is performed according to the number of the PDSCHs scheduled by the first-type DCI, where the first-type DCI is used for scheduling at least two PDSCHs.

In the embodiment, the only one group of C-DAI values and T-DAI values are contained in the first-type DCI, which refers to that all PDSCHs scheduled by the first-type DCI share this group of C-DAI values and T-DAI values and only the one PDSCH of the PDSCHs scheduled by the first-type DCI is used for indicating this group of C-DAI values and T-DAI values. For example, assuming that the first-type DCI schedules three PDSCHs which share one group of C-DAI values and T-DAI values, one of the three PDSCHs may be used for indicating this group of C-DAI values and T-DAI values.

In an embodiment, the reference carrier is a carrier with a highest carrier index or a lowest carrier index among carriers where all the PDSCHs scheduled by the first-type DCI are located. In an embodiment, the reference carrier is the carrier with the highest carrier index among the carriers where all the PDSCHs scheduled by the first-type DCI are located, that is, in the case where C-DAI counting is performed, the carrier where a PDSCH with the highest carrier index is located is used as the reference carrier for performing the counting. In an embodiment, the reference carrier is the carrier with the lowest carrier index among the carriers where all the PDSCHs scheduled by the first-type DCI are located, that is, in the case where the C-DAI counting is performed, the carrier where a PDSCH with the lowest carrier index is located is used as the reference carrier for performing the counting.

In an embodiment, in the case where the DCI is the first-type DCI and the only one group of C-DAI values and T-DAI values are contained in the first-type DCI, the at least two PDSCHs scheduled by the first-type DCI are located on different time domain resources of the same carrier. In the embodiment, in the case where the first-type DCI schedules the at least two PDSCHs, each PDSCH scheduled by the first-type DCI may be located on a different time domain resource of the same carrier.

In an embodiment, in the case where the DCI is the first-type DCI and the one of the PDSCHs scheduled by the first-type DCI is located in a carrier with a lowest carrier index or a highest carrier index among carriers where PDSCHs scheduled by all DCIs in the current MO are located, a C-DAI value and a T-DAI value corresponding to the PDSCH are not contained in the first-type DCI. In the embodiment, in the case where the one of the PDSCHs scheduled by the first-type DCI is located in the carrier with the lowest carrier index or the highest carrier index among the carriers where the PDSCHs scheduled by all the DCIs in the current MO are located, the C-DAI value and the T-DAI value corresponding to the PDSCH are not contained in the first-type DCI. That is, the C-DAI value and the T-DAI value corresponding to the PDSCH are derived in another manner. In the embodiment, a carrier, a component carrier, and a cell are the same concept in carrier aggregation. In the embodiment, the carrier is used as an example for describing the information generation method.

In an embodiment, the C-DAI value corresponding to the PDSCH is determined in at least one of manners described below.

The C-DAI value corresponding to the PDSCH is the T-DAI value in the DCI in the current MO.

Alternatively, the C-DAI value corresponding to the PDSCH is a sum of a T-DAI value in the DCI in a previous MO and 1.

The T-DAI value corresponding to the PDSCH is equal to the T-DAI value in the DCI in the current MO.

In the embodiment, in the case where the one of the PDSCHs scheduled by the first-type DCI is located in the carrier with the lowest carrier index or the highest carrier index among the carriers where the PDSCHs scheduled by all the DCIs in the current MO are located, the C-DAI value corresponding to the PDSCH is determined through the T-DAI value in the DCI in the current MO or the sum of the T-DAI value in the DCI in the previous MO and 1; and the T-DAI value corresponding to the PDSCH may be determined to be equal to the T-DAI value in the DCI in the current MO.

In the embodiment, in the case where the DCI is the first-type DCI and the at least two PDSCHs scheduled by the first-type DCI share the one group of C-DAI values and T-DAI values, the C-DAI value in the first-type DCI is determined according to the one of the PDSCHs scheduled by the first-type DCI, and other PDSCHs scheduled by the first-type DCI share the C-DAI value. In the embodiment, in the case where the at least two PDSCHs scheduled by the first-type DCI share the one group of C-DAI values and T-DAI values, the C-DAI value in the first-type DCI is determined according to any PDSCH scheduled by the first-type DCI, and the other PDSCHs scheduled by the first-type DCI share the C-DAI value together.

In an embodiment, in the case where the DCI is the first-type DCI and at least two groups of C-DAIS and T-DAIS are contained in the first-type DCI, each of the at least two groups of C-DAIS and T-DAIS separately corresponds to one of the PDSCHs scheduled by the first-type DCI. In the embodiment, in the case where multiple groups of C-DAI values and T-DAI values are contained in the first-type DCI, each of the multiple groups of C-DAI values and T-DAI values corresponds to the one of the PDSCHs scheduled by the first-type DCI.

In an embodiment, the counting is performed independently for the first-type DCI and the second-type DCI separately, where the second-type DCI is used for scheduling one PDSCH. In the embodiment, the counting is performed independently for the first-type DCI (that is, the one DCI which schedules the multiple PDSCHs) and the second-type DCI (that is, one DCI which schedules one PDSCH), which may minimize the impact of the loss of the one DCI which schedules the multiple PDSCHs on the reliability of the feedback codebook.

In an embodiment, in the case where the DCI is the first-type DCI and the one group of C-DAI values and T-DAI values are contained in the first-type DCI, the carrier where the one of the PDSCHs scheduled by the first-type DCI is located is used as the reference carrier for the C-DAI value, and one DAI value is accumulated for each first-type DCI. In the embodiment, in the case where the one group of C-DAI values and T-DAI values are contained in the first-type DCI, the carrier where any PDSCH scheduled by the first-type DCI is located is used as the reference carrier for the C-DAI value, and one DCI value is accumulated for each first-type DCI.

In an embodiment, in the case where the DCI is the first-type DCI and the only one group of C-DAI values and T-DAI values are contained in the first-type DCI, feedback bits of all the PDSCHs scheduled by the first-type DCI occupy consecutive bits in the feedback codebook, and all the PDSCHs scheduled by the first-type DCI are sorted according to a preset order and are in one-to-one correspondence with the consecutive bits from front to back.

In an embodiment, the preset order includes one of orders described below.

The PDSCHs are sorted from low to high according to indexes of carriers where the PDSCHs are located, and PDSCHs with the same carrier index are sorted from front to back according to time domain positions where the PDSCHs are located.

Alternatively, the PDSCHs are sorted from front to back according to time domain positions, and PDSCHs having the same time domain position are sorted from low to high according to indexes of carriers where the PDSCHs are located.

The time domain positions of the PDSCHs are starting positions of the PDSCHs in a time domain or ending positions of the PDSCHs in a time domain.

In an embodiment, in the case where the DCI is the first-type DCI and the only one group of C-DAI values and T-DAI values are contained in the first-type DCI, the feedback bits of all the PDSCHs scheduled by the first-type DCI occupy the consecutive bits in the feedback codebook, and all the PDSCHs scheduled by the first-type DCI may be sorted from low to high according to the indexes of the carriers where all the PDSCHs are located, and the PDSCHS with the same carrier index are further sorted from front to back according to the time domain positions where the PDSCHS with the same carrier index are located.

In an embodiment, in the case where the DCI is the first-type DCI and the only one group of C-DAI values and T-DAI values are contained in the first-type DCI, the feedback bits of all the PDSCHs scheduled by the first-type DCI occupy the consecutive bits in the feedback codebook, and all the PDSCHs scheduled by the first-type DCI may be sorted from front to back according to the time domain positions, and the PDSCHs having the same time domain position are further sorted from low to high according to the indexes of the carriers where the PDSCHs having the same time domain position are located.

In an embodiment, in the case where the DCI is the first-type DCI and the one of the PDSCHs scheduled by the first-type DCI is located in the carrier with the lowest carrier index or the highest carrier index among the carriers where the PDSCHs scheduled by all the DCIs in the current MO are located, feedback information about the PDSCHs scheduled by the first-type DCI is fixed at a first bit or a last bit of feedback information of the current MO.

In an embodiment, in the case where the DCI is the first-type DCI and the at least two groups of C-DAI values and T-DAI values are contained in the first-type DCI, one of all the PDSCHs scheduled by the first-type DCI and the PDSCH scheduled by the second-type DCI are counted together and contained in the same sub-codebook.

All the PDSCHs scheduled by the first-type DCI except the one PDSCH counted together with the PDSCH scheduled by the second-type DCI are counted together through an i-th PDSCH scheduled by the first-type DCI so that an i-th sub-codebook is generated, where $1 \leq i \leq N$.

A corresponding feedback codebook is generated using the same sub-codebook and N sub-codebooks in the manner of bit concatenation.

In an embodiment, each DAI count value in the first-type DCI corresponds to X bits in the feedback codebook, where X is related to the number of the PDSCHs scheduled by the first-type DCI.

In an embodiment, X is equal to the number of the PDSCHs scheduled by the first-type DCI.

Alternatively, in the case where each first-type DCI schedules an unequal number of PDSCHs, X is equal to a largest number among the numbers of PDSCHs scheduled by first-type DCIs.

In an embodiment, in the case where the DCI is the first-type DCI and all the PDSCHs scheduled by the first-type DCI correspond to one feedback bit, feedback information about all PDSCHs scheduled by each first-type DCI is bundled in a preset bundling rule so that the one feedback bit is obtained. In the embodiment, the preset bundling rule may be the manner of obtaining a union, that is, a union of the feedback information about all the PDSCHs scheduled by each first-type DCI is obtained so that the one feedback bit is obtained.

In an embodiment, in the case where the DCI is the first-type DCI, the method further includes the step in which a feedback timing reference position which corresponds to the feedback codebook is determined. In the embodiment, since feedback information about the multiple PDSCHs scheduled by the first-type DCI is multiplexed in the same feedback codebook, a uniform feedback timing reference position is set for each PDSCH, that is, a uniform position corresponding to K1 being equal to 0 is determined. In an embodiment, the feedback timing reference position refers to a slot position corresponding to K1 being equal to 0, where K1 denotes the number of offset slots between a slot where the PDSCH is located and a slot where feedback information corresponding to the PDSCH is located.

In an embodiment, the feedback timing reference position which corresponds to the feedback codebook is determined in one of manners described below.

The feedback timing reference position is determined using a PDSCH having a latest ending position among all the PDSCHs scheduled by the first-type DCI as a reference.

The feedback timing reference position is determined using a PDSCH having an earliest ending position among all the PDSCHs scheduled by the first-type DCI as a reference.

The feedback timing reference position is determined using a PDSCH with a lowest carrier index among all the PDSCHs scheduled by the first-type DCI as a reference.

The feedback timing reference position is determined using a PDSCH with a highest carrier index among all the PDSCHs scheduled by the first-type DCI as a reference.

Figure 2:
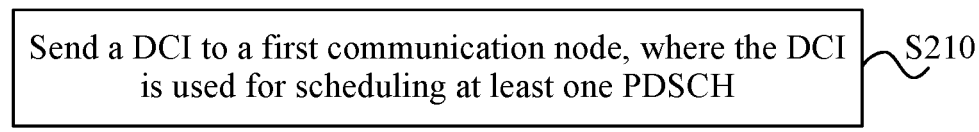
FIG. 2 is a flowchart of another information generation method according to an embodiment of the present application.

FIG. 2 is a flowchart of another information generation method according to an embodiment of the present application. This embodiment is applied to a second communication node. For example, the second communication node may be a base station. As shown in FIG. 2, this embodiment includes S210.

In S210, a DCI is sent to a first communication node, where the DCI is used for scheduling at least one physical downlink shared channel (PDSCH).

In the embodiment, the DCI is further used for causing the first communication node to generate a corresponding feedback codebook according to a C-DAI value and T-DAI value which are contained in a DAI indicator field in the DCI.

In the embodiment, the second communication node sends the DCI to the first communication node, the DAI indicator field is carried in the DCI, and the C-DAI value and the T-DAI value are contained in the DAI indicator field. After the first communication node receives the DCI, the corresponding feedback codebook may be generated according to the C-DAI value and the T-DAI value contained in the DAI field of the DCI.

In an embodiment, for the description of the C-DAI value, the T-DAI value, and the feedback codebook in the information generation method applied to the second communication node, reference may be made to the description of the information generation method applied to the first communication node in the preceding embodiment. The details are not repeated here.

In a related system, one DCI can schedule only one PDSCH, where the PDSCH and the DCI may be located on the same carrier (a carrier may also be referred to as a component carrier (CC)) or cell, which may be referred to as self-scheduling; or the PDSCH and the DCI are located on different carriers, which may be referred to as cross-carrier scheduling in this case.

Figure 3:
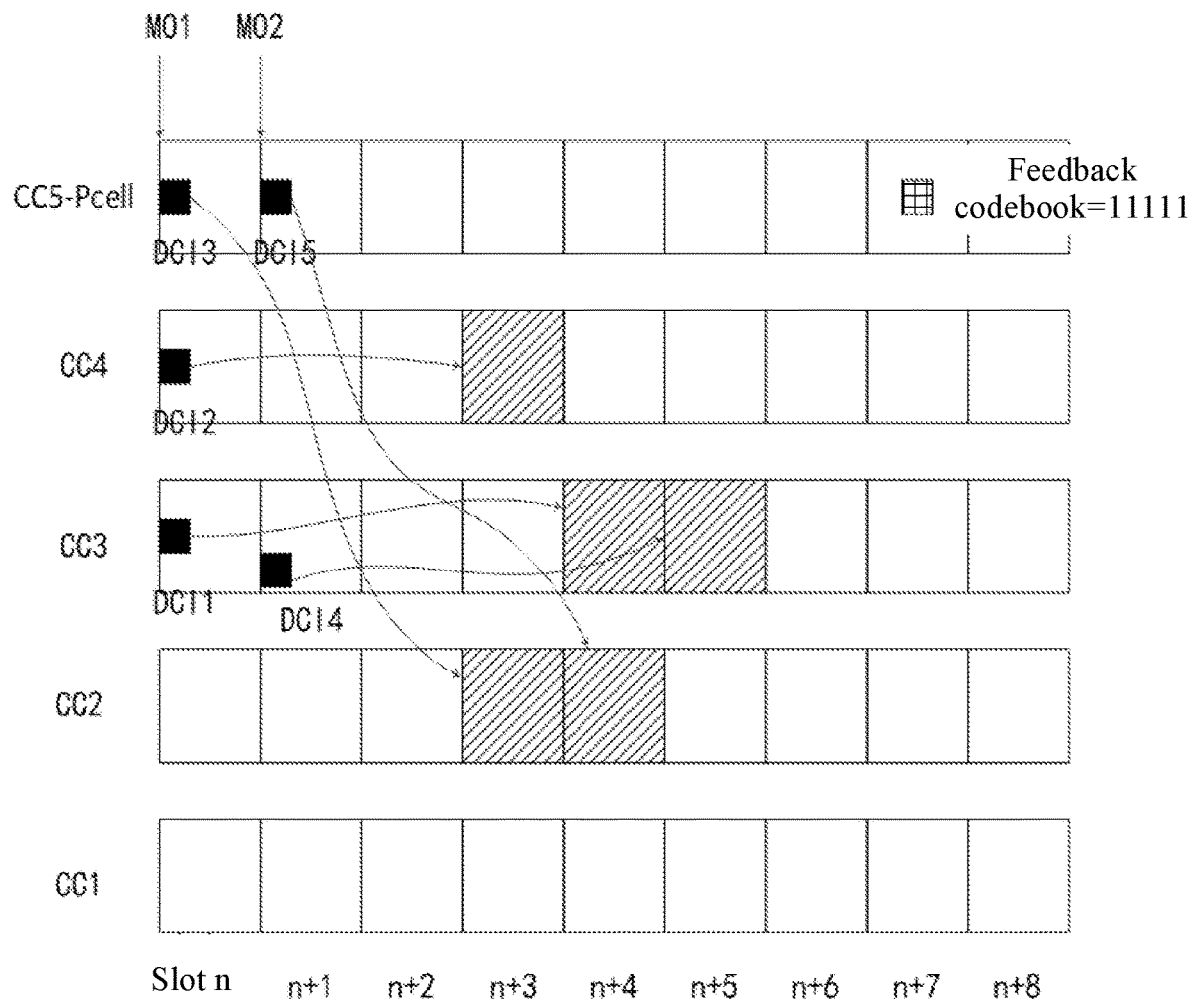
FIG. 3 is a schematic diagram illustrating a dynamic codebook generation and feedback manner in the related art.

FIG. 3 is a schematic diagram illustrating a dynamic codebook generation and feedback manner in the related art. As shown in FIG. 3, three DCIs are contained in monitoring occasion 1 (MO1) (which are DCI1, DCI2, and DCI3, respectively). Two DCIs are contained in monitoring occasion 2 (MO2) (which are DCI4 and DCI5, respectively). PDSCHs scheduled by these DCIs are each fed back in slot n+7 according to indications of their own DCIs about feedback timing and multiplexed in one feedback codebook.

DCI1 is located on CC3, and a PDSCH scheduled by DCI1 is located in slot n+4 on CC3; DCI2 is located on CC4, and a PDSCH scheduled by DCI2 is located in slot n+3 on CC4; DCI3 is located on CC5, and a PDSCH scheduled by DCI3 is located in slot n+3 on CC2; DCI4 is located on CC3, and a PDSCH scheduled by DCI4 is located in slot n+5 on CC3; and DCI5 is located on CC5, and a PDSCH scheduled by DCI5 is located in slot n+4 on CC2.

A C-DAI value in each DCI is counted according to the following: first, these DCIs are sorted according to a chronological order of MOs; and DCIs in the same MO is further sorted from low to high according to indexes of carriers where PDSCHs scheduled by the DCIs are located. Since one DCI can schedule only one PDSCH, the C-DAI value may be regarded as a count of the DCIs or a count of the PDSCHs.

In the embodiment, PDSCHs scheduled by the DCIs in MO1 are counted before PDSCHs scheduled by the DCIs in MO2 are counted. The three DCIs are contained in MO1 and further sorted from low to high according to the indexes of the carriers where the PDSCHs scheduled by the DCIs are located, that is, since the PDSCH scheduled by DCI3 is on CC2, DCI3 is ranked first and followed by DCI1 and DCI2 in sequence. The C-DAI value is counted in the counting rule with 4 as a cycle, that is, after the C-DAI value is counted to 4, a C-DAI value of the next downlink transmission is recorded as 1. As for the T-DAI value, the same T-DAI value is contained in the DCIs in the same MO and used for indicating the total number of PDSCHs which are scheduled up to a current MO and need to be fed back in the same feedback codebook. The T-DAI value is also counted in the counting rule with 4 as a cycle. Thus, in DCI3, {C-DAI, T-DAI}={1, 3}; in DCI1, {C-DAI, T-DAI}={2, 3}; and in DCI2, {C-DAI, T-DAI}={3, 3}. Correspondingly, first three bits in the feedback codebook sequentially correspond to the PDSCH scheduled by DCI3, the PDSCH scheduled by DCI1, and the PDSCH scheduled by DCI2.

In the embodiment, the PDSCHs scheduled by the DCIs in the next MO (MO2) are then counted in a similar manner. In DCIs, {C-DAI, T-DAI}={4, 1}; and in DCI4, {C-DAI, T-DAT}={1, 1}. Correspondingly, a fourth bit and a fifth bit in the feedback codebook sequentially correspond to the PDSCH scheduled by DCIs and the PDSCH scheduled by DCI4.

It is to be noted that since the C-DAI value is counted in the counting rule with 4 as the cycle, the C-DAI of a fifth PDSCH (that is, the PDSCH scheduled by DCI4) is equal to 1; and since the T-DAI value is counted in the counting rule with 4 as the cycle, five PDSCHs are scheduled in total up to MO2, and thus, in the DCI in MO2, T-DAI=1.

In the case where all PDSCHs are correctly received, the feedback codebook is 11111. In the case where a certain DCI or multiple DCIs are missed or the PDSCHs are not correctly received, corresponding bits in the feedback codebook are set to 0.

In the case where it is supported in the system that one DCI is used for scheduling multiple PDSCHs, how to design the DAI indicator field in the DCI and how to generate the feedback codebook are problems which need to be solved in the present application. In the embodiment, DCI which can schedule more than one PDSCH is referred to as type 1 DCI (that is, the first-type DCI in the preceding embodiment); and DCI which schedules only one PDSCH is referred to as type 2 DCI (that is, the second-type DCI in the preceding embodiment).

The following embodiment is described using the example in which one DCI schedules two PDSCHs, where the two PDSCHs scheduled by the one DCI may be located on different carriers or on different time domain resources of the same carrier.

Figure 4:
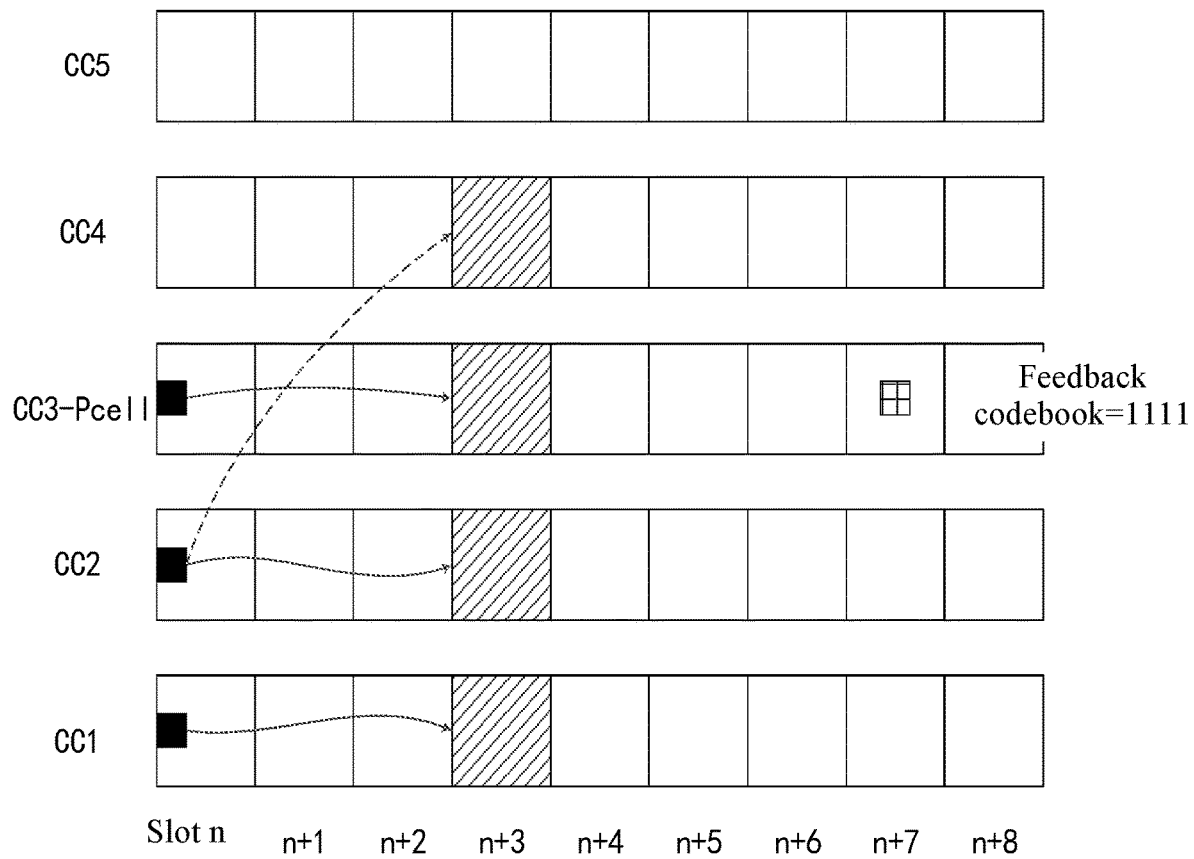
FIG. 4 is a schematic diagram illustrating an indication of a DAI indicator field in one DCI which schedules multiple PDSCHs according to an embodiment of the present application.

In an implementation, an indication manner of a DAI in one DCI which schedules multiple PDSCHs and a method for dynamically generating a feedback codebook are described in this embodiment. FIG. 4 is a schematic diagram illustrating an indication of a DAI indicator field in the one DCI which schedules the multiple PDSCHs according to an embodiment of the present application.

In the embodiment, only one group of C-DAI values and T-DAI values are contained in the type 1 DCI, where a carrier where a certain PDSCH scheduled by the type 1 DCI is located is used as a reference carrier for a C-DAI value and counting is performed according to the number of scheduled PDSCHs. A T-DAI value is used for indicating the total number of PDSCHs which are scheduled up to a current MO and need to be fed back in the same feedback codebook. It is to be noted that due to the existence of the type 1 DCI, the number of DCIs is no longer always equal to the number of PDSCHs, feedback information is the feedback of receiving states of the PDSCHs, and the C-DAI value and the T-DAI value are used for determining a size of the feedback codebook and a relationship between a bit in the feedback codebook and a PDSCH. Thus, the C-DAI value and the T-DAI value may be only counts of PDSCHs which need to be fed back in the same feedback codebook.

As shown in FIG. 4, in this embodiment, in the case where the C-DAI value is counted, a carrier where a PDSCH with a lowest carrier index is located may be used as the reference carrier for performing the counting, that is, in the case where the C-DAI value is determined, the PDSCH with the lowest carrier index is sorted together with PDSCHs scheduled by other DCIs in the same MO. For example, using the example in which two PDSCHs are scheduled on CC2, one type 1 DCI is carried on CC2, and PDSCHs scheduled by the one type 1 DCI are located on CC2 and CC4, respectively; and in the same MO, one type 2 DCI is separately carried on CC1 and CC3, and each type 2 DCI schedules one PDSCH.

In the case where the C-DAI value is counted, a carrier where a PDSCH with a relatively low carrier index is located may be used as the reference carrier for performing the counting, that is, two PDSCHs scheduled by the type 1 DCI on CC2 are located on CC2 and CC4, respectively, and then CC2 is used as the reference carrier for counting the C-DAI value. A PDSCH on CC1 is counted first, that is, C-DAI=1; then, A PDSCH on CC2 is counted, on the basis of the preceding rule, according to the number of the PDSCHs scheduled by the type 1 DCI, and thus, the C-DAI value in the type 1 DCI is increased by 2, that is, C-DAI=3; and finally, a PDSCH on CC3 is counted, that is, in the DCI on CC3, C-DAI=4. The total number of the PDSCHs which are scheduled in this MO and need to be fed back in the same feedback codebook is 4, and thus, the T-DAI value in each DCI is equal to 4.

Multiple PDSCHs scheduled by the type 1 DCI occupy consecutive bits, the PDSCHs are sorted from low to high according to indexes of carriers where the PDSCHs are located, and the PDSCHs are in one-to-one correspondence with bits in the consecutive bits from front to back. That is, the PDSCHs scheduled by CC2 in FIG. 4 and located on CC2 and CC4 respectively occupy a second bit and a third bit in the feedback codebook. A first bit in the feedback codebook corresponds to the PDSCH on CC1, and a fourth bit in the feedback codebook corresponds to the PDSCH on CC3.

In the preceding manner, if the type 1 DCI schedules N PDSCHs, N C-DAI values are accumulated. The N PDSCHs occupy N consecutive bits in the feedback codebook, are sorted from low to high according to indexes of carriers where the N PDSCHs are located, and are in one-to-one correspondence with the N bits from front to back, respectively.

Figure 5:
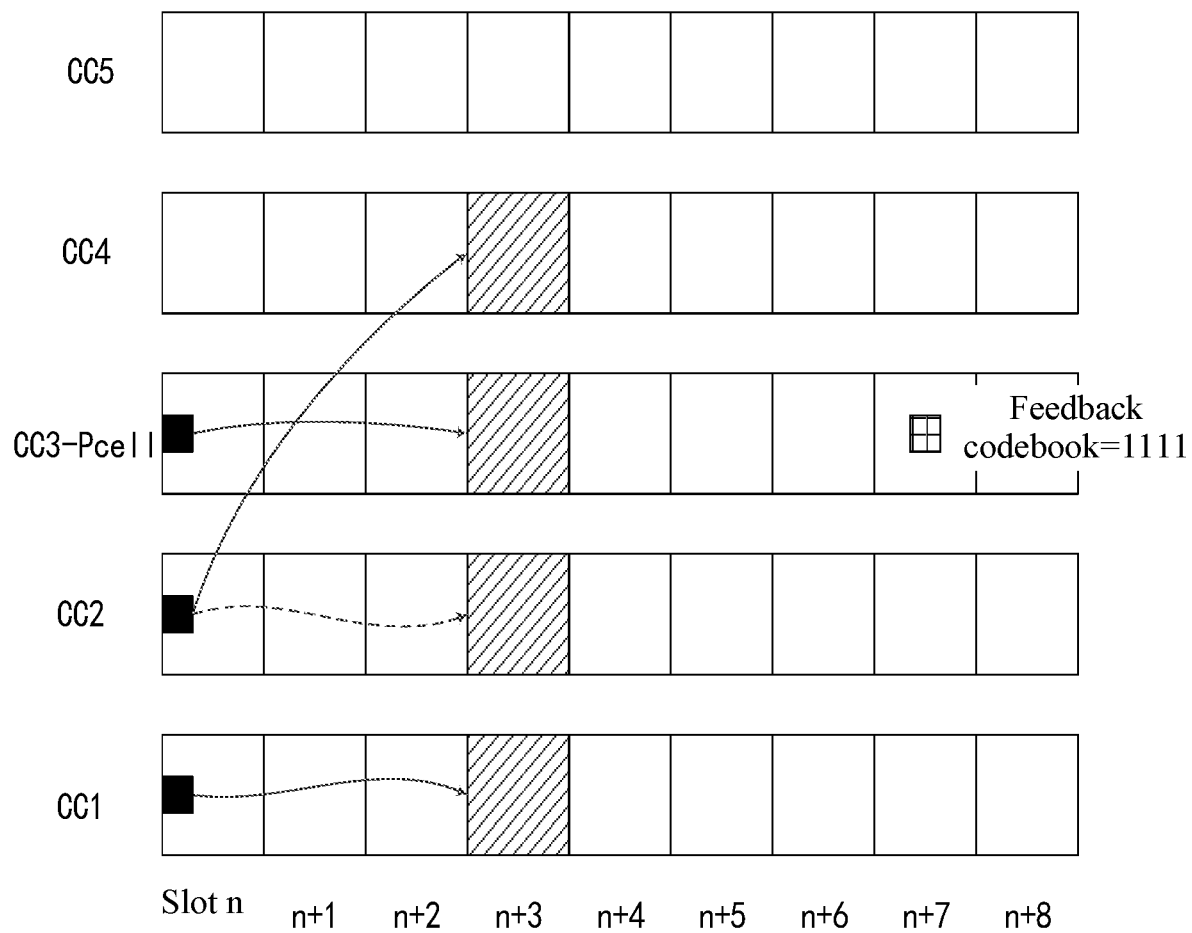
FIG. 5 is a schematic diagram illustrating another indication of a DAI indicator field in one DCI which schedules multiple PDSCHs according to an embodiment of the present application.

In an implementation, another indication manner of a DAI in one DCI which schedules multiple PDSCHs and another method for dynamically generating a codebook are described in this embodiment. FIG. 5 is a schematic diagram illustrating another indication of a DAI indicator field in the one DCI which schedules the multiple PDSCHs according to an embodiment of the present application.

In the embodiment, only one group of C-DAI values and T-DAI values are contained in the type 1 DCI, where a carrier where a certain PDSCH scheduled by the type 1 DCI is located is used as a reference carrier for a C-DAI value and counting is performed according to the number of scheduled PDSCHs. A T-DAI value is used for indicating the total number of PDSCHs which are scheduled up to a current MO and need to be fed back in the same feedback codebook.

As shown in FIG. 5, in this embodiment, one type 1 DCI is carried on CC2, and PDSCHs scheduled by the one type 1 DCI are located on CC2 and CC4, respectively; and in the same MO, one type 2 DCI is separately carried on CC1 and CC3, and each type 2 DCI schedules one PDSCH.

In the case where the C-DAI value is counted, a carrier where a PDSCH with a relatively high carrier index is located may also be used as the reference carrier for performing the counting, that is, two PDSCHs scheduled by the type 1 DCI on CC2 are located on CC2 and CC4, respectively, and then CC4 is used as the reference carrier for counting the C-DAI value. A PDSCH on CC1 is counted first, that is, C-DAI=1; then, a PDSCH on CC3 is counted, that is, in the DCI on CC3, C-DAI=3; finally, a PDSCH on CC4 is counted, on the basis of the preceding rule, according to the number of the PDSCHs scheduled by the type 1 DCI; and thus, the C-DAI value in the type 1 DCI is increased by 2, that is, C-DAI=4. The total number of the PDSCHs which are scheduled in this MO and need to be fed back in the same feedback codebook is 4, and thus, the T-DAI value in each DCI is equal to 4.

Multiple PDSCHs scheduled by the type 1 DCI occupy consecutive bits, the PDSCHs are sorted from low to high according to indexes of carriers where the PDSCHs are located, and the PDSCHs are in one-to-one correspondence with bits in the consecutive bits from front to back. That is, the PDSCHs scheduled by CC2 in FIG. 5 and located on CC2 and CC4 respectively occupy a third bit and a fourth bit in the feedback codebook. A first bit in the feedback codebook corresponds to the PDSCH on CC1, and a second bit in the feedback codebook corresponds to the PDSCH on CC3.

In the preceding manner, if the type 1 DCI schedules N PDSCHs, the N PDSCHs occupy N consecutive bits in the feedback codebook, are sorted from low to high according to indexes of carriers where the N PDSCHs are located, and are in one-to-one correspondence with the N bits from front to back, respectively.

Figure 6:
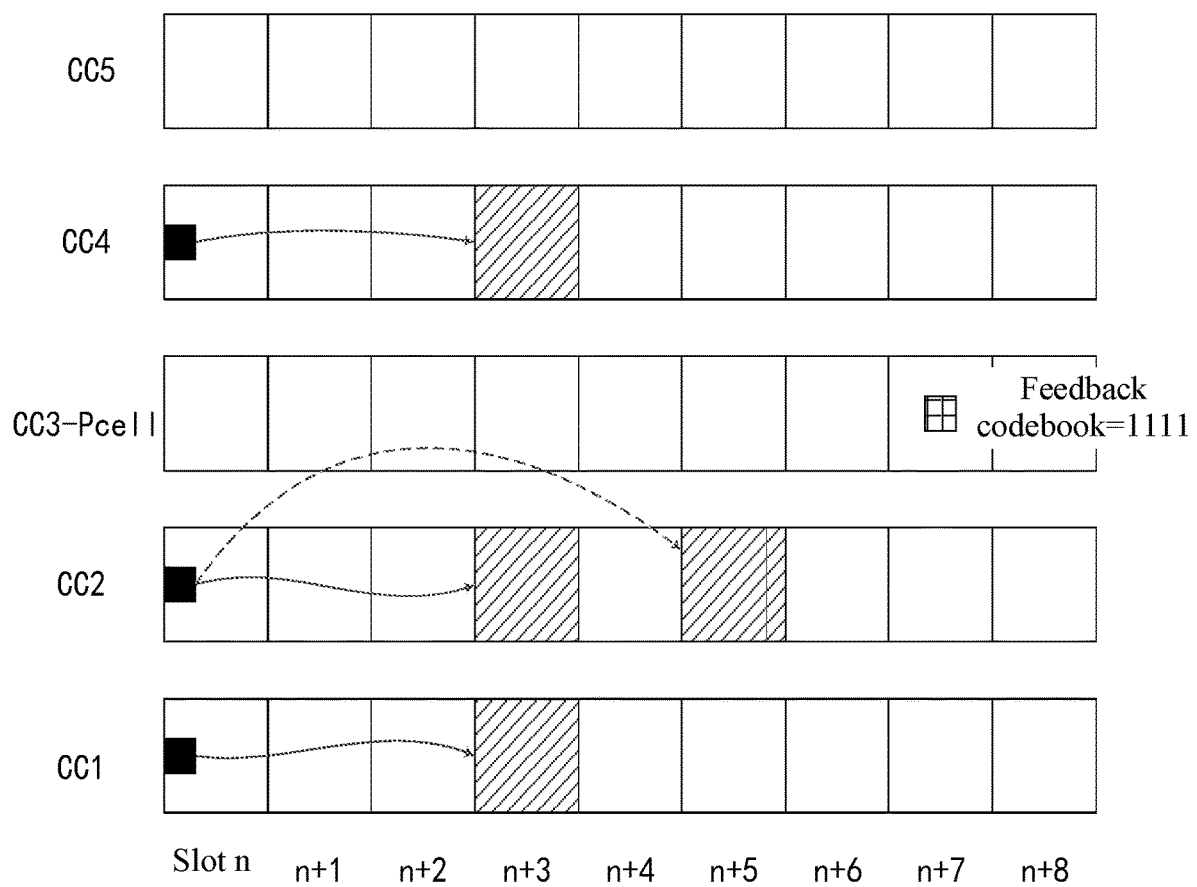
FIG. 6 is a schematic diagram illustrating another indication of a DAI indicator field in one DCI which schedules multiple PDSCHs according to an embodiment of the present application.

In an implementation manner, another indication manner of a DAI in one DCI which schedules multiple PDSCHs and another method for dynamically generating a codebook are described in this embodiment. FIG. 6 is a schematic diagram illustrating another indication of a DAI indicator field in the one DCI which schedules the multiple PDSCHs according to an embodiment of the present application.

In the embodiment, only one group of C-DAI values and T-DAI values are contained in the type 1 DCI, where multiple PDSCHs scheduled by the type 1 DCI are located on different time domain resources of the same carrier. Then, a C-DAI value is counted according to the number of scheduled PDSCHs. A T-DAI value is used for indicating the total number of PDSCHs which are scheduled up to a current MO and need to be fed back in the same feedback codebook.

As shown in FIG. 6, in the embodiment, one type 1 DCI is carried on CC2, and PDSCHs scheduled by the one type 1 DCI are located on slot n+3 and slot n+5 on CC2, respectively; and in the same MO, one type 2 DCI is separately carried on CC1 and CC4, and each type 2 DCI schedules one PDSCH.

In the case where the C-DAI value is counted, a PDSCH on CC1 is counted first, that is, C-DAI=1; then, a PDSCH on CC2 is counted, on the basis of the preceding rule, according to the number of the PDSCHs scheduled by the type 1 DCI, and thus, the C-DAI value in the type 1 DCI is increased by 2, that is, C-DAI=3; and finally, a PDSCH on CC4 is counted, that is, in the DCI on CC4, C-DAI=4. The total number of the PDSCHs which are scheduled in this MO and need to be fed back in the same feedback codebook is 4, and thus, the T-DAI value in each DCI is equal to 4.

The multiple PDSCHs scheduled by the type 1 DCI occupy consecutive bits, the PDSCHs are sorted from front to back according to time domain positions of the PDSCHs, and the PDSCHs are in one-to-one correspondence with bits in the consecutive bits from front to back, respectively, where the time domain positions of the PDSCHs may be starting positions of the PDSCHs in a time domain or ending positions of the PDSCHs in a time domain. That is, the two PDSCHs scheduled by CC2 in FIG. 6 occupy a second bit and a third bit in the feedback codebook in sequence according to a chronological order. A first bit in the feedback codebook corresponds to the PDSCH on CC1, and a fourth bit in the feedback codebook corresponds to the PDSCH on CC4.

In the preceding manner, if the type 1 DCI schedules N PDSCHs, N C-DAI values are accumulated. The N PDSCHs occupy N consecutive bits in the feedback codebook, are sorted from low to high according to the chronological order, and are in one-to-one correspondence with the N bits from front to back, respectively.

Figure 7:
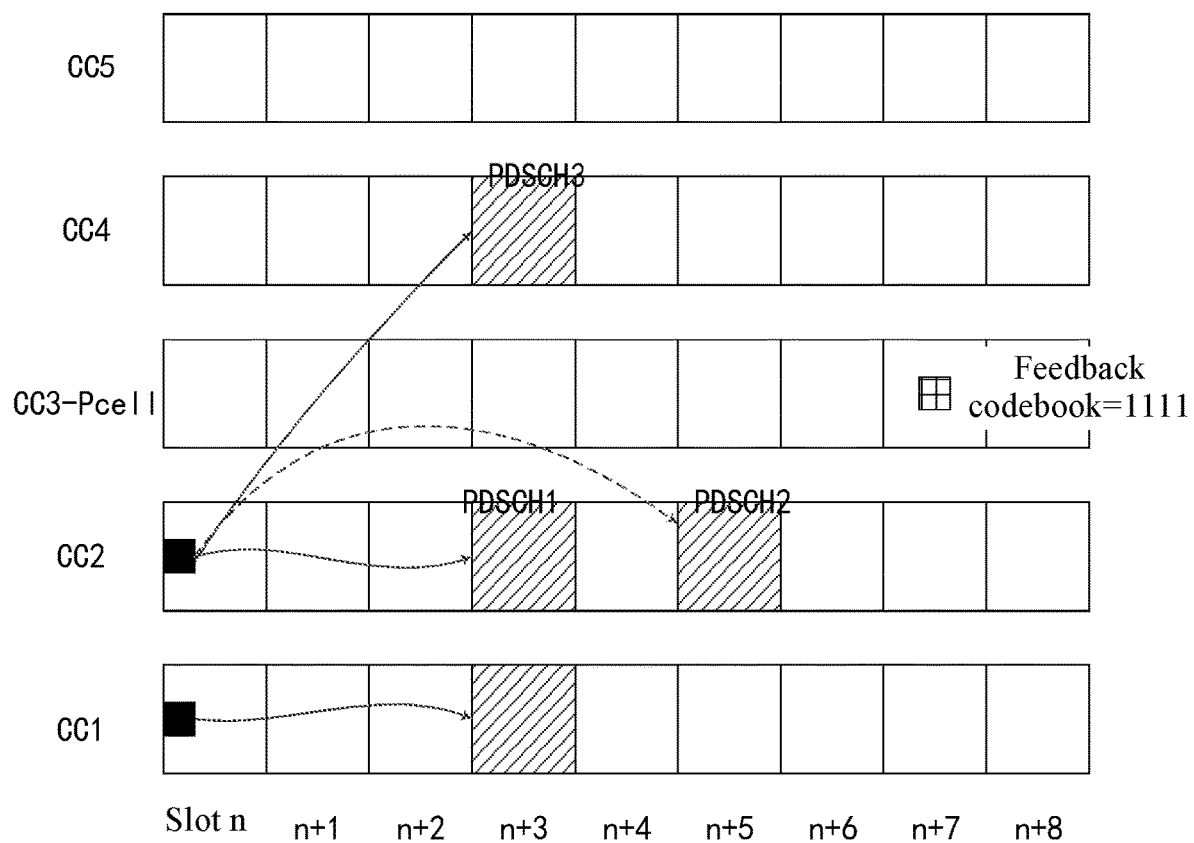
FIG. 7 is a schematic diagram illustrating another indication of a DAI indicator field in one DCI which schedules multiple PDSCHs according to an embodiment of the present application.

In an implementation, another indication manner of a DAI in one DCI which schedules multiple PDSCHs and another method for dynamically generating a codebook are described in this embodiment. FIG. 7 is a schematic diagram illustrating another indication of a DAI indicator field in the one DCI which schedules the multiple PDSCHs according to an embodiment of the present application.

In the embodiment, in the case where multiple PDSCHs scheduled by the type 1 DCI may be distributed on multiple carriers as well as different time domain positions on the same carrier, a carrier where a certain PDSCH scheduled by the type 1 DCI is located may also be used as a reference carrier (for example, a carrier with a lowest carrier index among carriers where all PDSCHs scheduled by the type 1 DCI are located is used as the reference carrier, or a carrier with a highest carrier index among carriers where all the PDSCHs scheduled by the type 1 DCI are located is used as the reference carrier) for a C-DAI value in the type 1 DCI, and counting is performed according to the number of scheduled PDSCHs. A T-DAI value is used for indicating the total number of PDSCHs which are scheduled up to a current MO and need to be fed back in the same feedback codebook. As shown in FIG. 7, in this configuration, in the DCI on CC1, C-DAI=1, and a C-DAI value in the type 1 DCI on CC2 is accumulated by 3, that is, C-DAI=1+3=4; and four PDSCHs are accumulatively scheduled up to the current MO, and thus, each of T-DAI values in the two DCIs is equal to 4.

Feedback bits of the multiple PDSCHs scheduled by the type 1 DCI occupy consecutive bits in the feedback codebook. In this case, the order of the feedback bits of the multiple PDSCHs scheduled by the type 1 DCI may be defined. For example, one sorting manner is that the PDSCHs are sorted from low to high according to indexes of carriers where the PDSCHs are located, and PDSCHS with the same carrier index are further sorted from front to back according to time domain positions where the PDSCHS are located, where the time domain positions of the PDSCHs may be starting positions of the PDSCHs in a time domain or ending positions of the PDSCHs in a time domain. In the configuration shown in FIG. 7, the order of PDSCHs scheduled by the type 1 DCI on CC2 are PDSCH1, PDSCH2, and PDSCH3, which correspond to a second bit, a third bit, and a fourth bit in the feedback codebook in sequence.

Another sorting manner is that the PDSCHs are sorted from front to back according to the time domain positions, and PDSCHs having the same time domain position are further sorted from low to high according to the indexes of the carriers where the PDSCHs are located, where the time domain positions of the PDSCHs may be the starting positions of the PDSCHs in the time domain or the ending positions of the PDSCHs in the time domain. In the configuration shown in FIG. 7, the order of the PDSCHs scheduled by the type 1 DCI on CC2 are PDSCH1, PDSCH3, and PDSCH2, which correspond to the second bit, the third bit, and the fourth bit in the feedback codebook in sequence.

Figure 8:
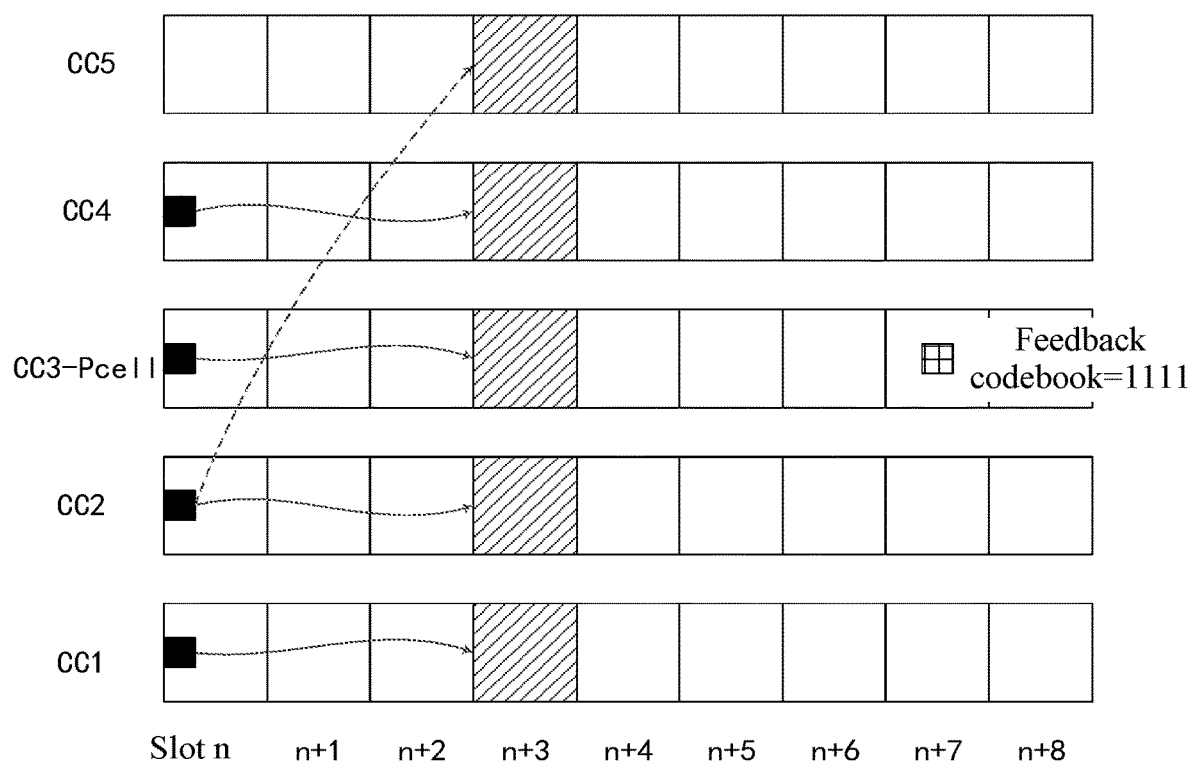
FIG. 8 is a schematic diagram illustrating another indication of a DAI indicator field in one DCI which schedules multiple PDSCHs according to an embodiment of the present application.

In an implementation, another indication manner of a DAI in one DCI which schedules multiple PDSCHs and another method for dynamically generating a codebook are described in this embodiment. FIG. 8 is a schematic diagram illustrating another indication of a DAI indicator field in the one DCI which schedules the multiple PDSCHs according to an embodiment of the present application.

In the embodiment, in the case where a certain PDSCH scheduled by the type 1 DCI is located in a CC with a lowest index CC a highest carrier index among CCs where PDSCHs scheduled by all DCI in a current MO are located, a C-DAI value and a T-DAI value of the PDSCH are not contained in the type 1 DCI.

In the embodiment, a UE may derive the C-DAI value corresponding to the preceding PDSCH according to one or more manners described below.

The C-DAI value corresponding to the PDSCH is the T-DAI value in the DCI in the current MO.

Alternatively, the C-DAI value corresponding to the PDSCH is a sum of a T-DAI value in the DCI in a previous MO and 1.

The T-DAI value corresponding to the preceding PDSCH is equal to the T-DAI value in the DCI in the current MO.

In the embodiment, in the case where the certain PDSCH (a PDSCH on CC5) scheduled by the type 1 DCI is configured on a CC with a highest index among all CCs or it is ensured that a CC where the scheduled PDSCH is located has a highest index among the CCs where the PDSCHs scheduled by all the DCIs in the current MO are located, the C-DAI value and the T-DAI value of the PDSCH are not contained in the type 1 DCI on CC2, that is, the C-DAI value and the T-DAI value may be derived, that is, the C-DAI is equal to the T-DAI which is equal to the T-DAI value in the DCI in the current MO.

In this case, feedback information about the PDSCH is fixed at a last bit of feedback information of the current MO.

Figure 9:
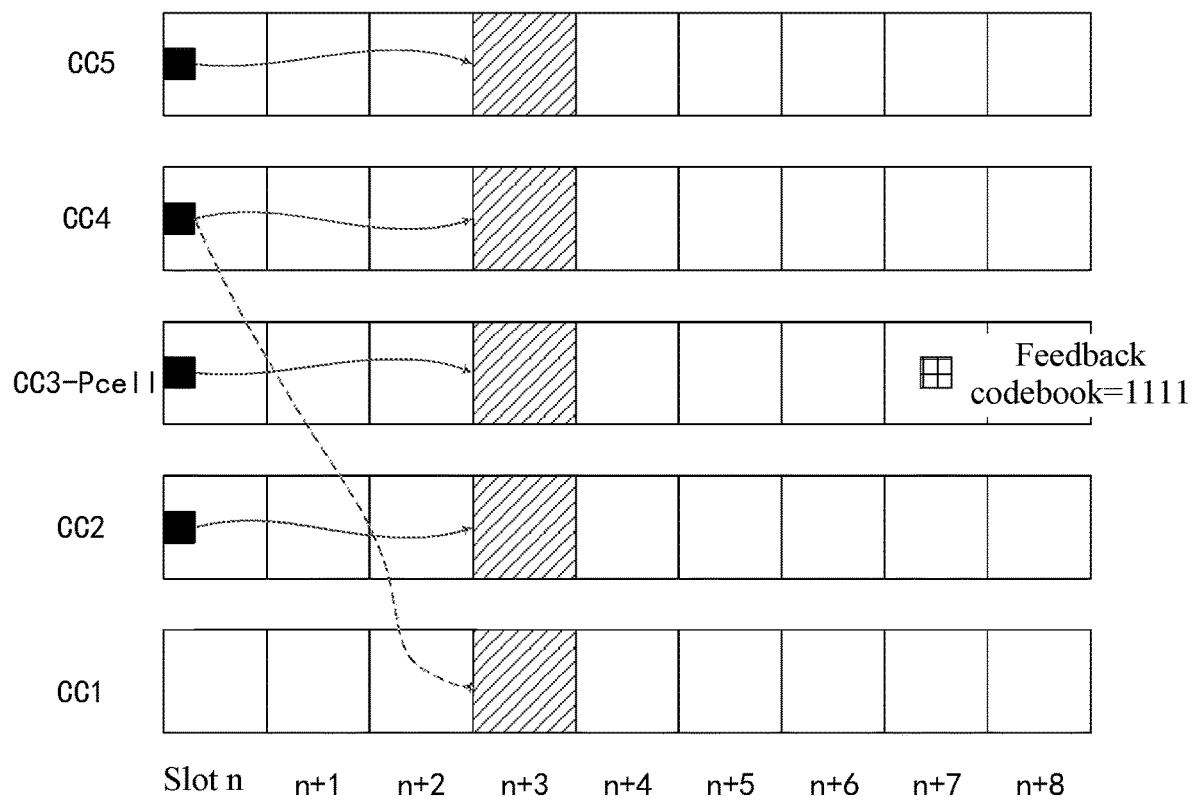
FIG. 9 is a schematic diagram illustrating another indication of a DAI indicator field in one DCI which schedules multiple PDSCHs according to an embodiment of the present application.

Similarly, FIG. 9 is a schematic diagram illustrating another indication of a DAI indicator field in the one DCI which schedules the multiple PDSCHs according to an embodiment of the present application. As shown in FIG. 9, in the case where the certain PDSCH (a PDSCH on CC1) scheduled by the type 1 DCI is configured on a CC with a lowest index among all the CCs or it is ensured that a CC where the scheduled PDSCH is located has a lowest index among the CCs where the PDSCHs scheduled by all the DCIs in the current MO are located, the C-DAI value and the T-DAI value of the PDSCH are not contained in the type 1 DCI on CC4, that is, the C-DAI value and the T-DAI value may be derived, that is, the C-DAI is equal to the sum of the T-DAI value in the DCI in the previous MO and 1; and the T-DAI is equal to the T-DAI value in the DCI in the current MO.

In this case, feedback information about the PDSCH is fixed at a first bit of the feedback information of the current MO.

Figure 10:
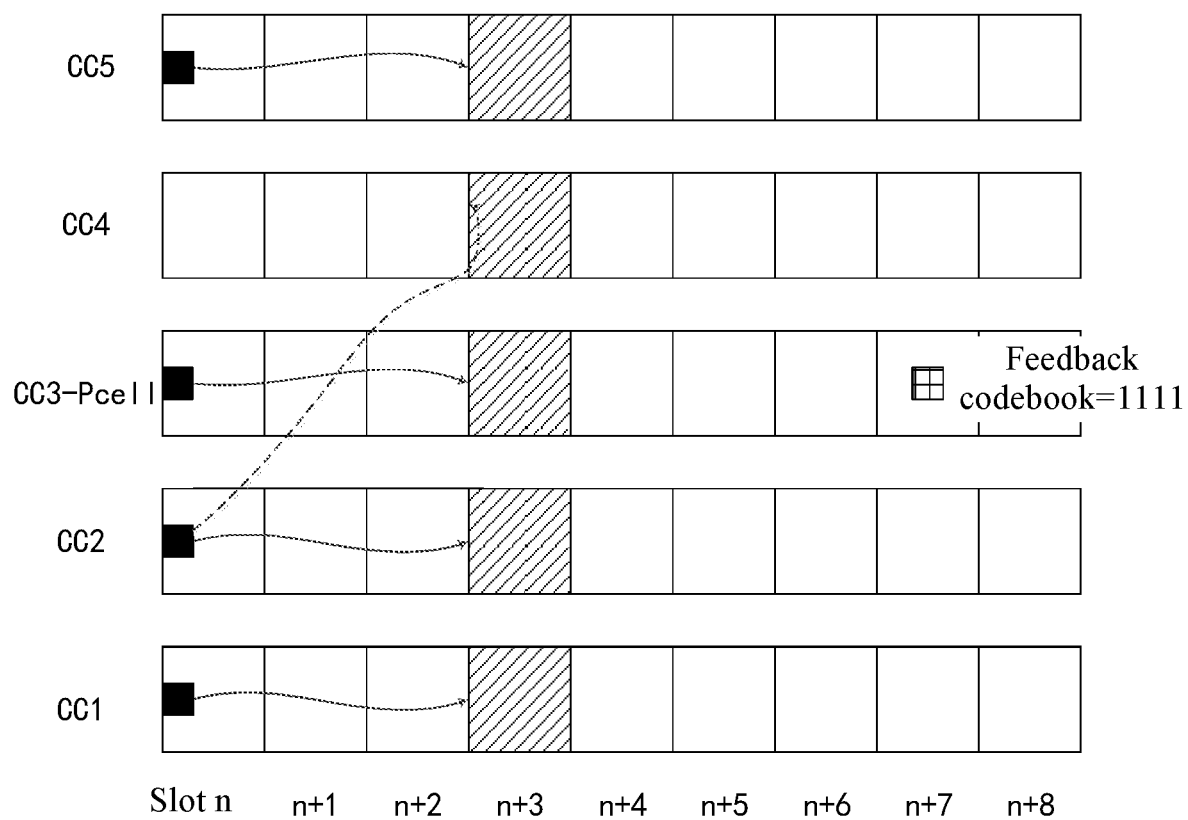
FIG. 10 is a schematic diagram illustrating another indication of a DAI indicator field in one DCI which schedules multiple PDSCHs according to an embodiment of the present application.

In an implementation, another indication manner of a DAI in one DCI which schedules multiple PDSCHs and another method for dynamically generating a codebook are described in this embodiment. FIG. 10 is a schematic diagram illustrating another indication of a DAI indicator field in the one DCI which schedules the multiple PDSCHs according to an embodiment of the present application.

In the embodiment, the multiple PDSCHs scheduled by the type 1 DCI share one group of C-DAI values and T-DAI values. In the embodiment, a C-DAI value in the type 1 DCI is determined according to a certain PDSCH scheduled by the type 1 DCI, and other PDSCHs shares this C-DAI value. As shown in FIG. 10, type 1 DCI on CC2 schedules two PDSCHs which are located on CC2 and CC4, respectively. The C-DAI value may be determined according to a PDSCH with a relatively low CC index, and then C-DAI=2. A C-DAI value corresponding to the PDSCH on CC4 is also equal to 2. Furthermore, a C-DAI value corresponding to the PDSCH on CC5 is equal to 3.

A T-DAI value is equal to a C-DAI value corresponding to a PDSCH with a highest CC index, that is, a T-DAI value in each DCI in a current MO is equal to 3.

The terminal determines the feedback codebook according to the receiving status of the PDSCHs and the C-DAI value and the T-DAI value in the corresponding DCI. Assuming that the terminal successfully receives all PDSCHs which are actually transmitted, a generated feedback codebook is 1110011. In CC3, a C-DAI corresponding to the PDSCH is equal to 3, and in CC4, the C-DAI corresponding to the PDSCH is equal to 2. The terminal will understand that two PDSCHs are lost between the two PDSCHs. Therefore, two zeros will be added to corresponding positions in the feedback codebook. Actually, since the two PDSCHs share the same C-DAI value and T-DAI value, some C-DAI values are skipped.

In this case, the base station and the UE have no ambiguity in understanding the size of the codebook and the correspondence between the feedback information and the PDSCHs. However, a codebook overhead (0-3 bits) may be increased. As shown in FIG. 10, a feedback overhead of 2 bits will be increased.

In an implementation, another indication manner of a DAI in the one DCI which schedules the multiple PDSCHs and another method for dynamically generating a codebook are described in this embodiment.

In the embodiment, multiple groups of C-DAI values and T-DAI values contained in the DAI indicator field in the type 1 DCI are in one-to-one correspondence with multiple PDSCHs scheduled by the type 1 DCI. In this case, feedback information about different PDSCHs is contained in different sub-codebooks, and all sub-codebooks are combined into one feedback codebook through the bit concatenation.

In an embodiment, a certain PDSCH among the multiple PDSCHs (for example, a PDSCH with a lowest carrier index and/or an earliest starting time) and PDSCHs scheduled by type 2 DCI are counted together and contained in the same sub-codebook.

In the embodiment, using the example in which the type 1 DCI schedules two PDSCHs, two groups of C-DAI values and T-DAI values are contained in the type 1 DCI, which respectively correspond to the two PDSCHs (for example, a first PDSCH and a second PDSCH). In addition, the first PDSCH is counted together with the PDSCHs scheduled by the type 2 DCI for generating a first sub-codebook. All second PDSCHs of the type 1 DCI are counted together for generating a second sub-codebook. Finally, the two sub-codebooks form one feedback codebook through the bit concatenation. For example, the bits of the first sub-codebook precede the bits of the second sub-codebook.

In an implementation, another indication manner of a DAI indicator field in the one DCI which schedules the multiple PDSCHs and another method for dynamically generating a codebook are described in this embodiment.

In the embodiment, the type 1 DCI and the type 2 DCI are independently counted to generate sub-codebooks respectively, and the feedback codebook is obtained through the bit concatenation.

In the embodiment, only one group of C-DAI values and T-DAI values are contained in either type of DCI. Since DCIs in the type 1 DCI are all the DCIs which schedules the multiple PDSCHs, the C-DAI value and the T-DAI value may be counted according to the DCI. However, each DAI count value corresponds to X bits in the feedback codebook, where X is related to the number of the PDSCHs scheduled by the type 1 DCI. For example, X is equal to the number of the PDSCHs scheduled by the type 1 DCI; or, in the case where each type 1 DCI schedules an unequal number of PDSCHs, X is equal to a largest number of PDSCHs scheduled by a type 1 DCI.

Assuming that the protocol specifies that the largest number of the PDSCHs scheduled by the type 1 DCI is 2, a DAI count value in each type 1 DCI corresponds to 2 bits in the sub-codebook (for example, the second sub-codebook). In the sub-codebook corresponding to the type 2 DCI, a DAI count value in each type 2 DCI corresponds to 1 bit in the sub-codebook (for example, the first sub-codebook). Finally, the two sub-codebooks form the one feedback codebook through the bit concatenation. For example, the bits of the first sub-codebook precede the bits of the second sub-codebook.

In an implementation manner, another indication manner of the DAI in the one DCI which schedules the multiple PDSCHs and another method for dynamically generating a codebook are described in this embodiment.

In the embodiment, only one group of C-DAI values and T-DAI values are contained in the type 1 DCI, where a carrier where a certain PDSCH scheduled by the type 1 DCI is located is used as a reference for a C-DAI value and only one DAI value is accumulated for each type 1 DCI. A T-DAI value is used for indicating the total number of PDSCHs which are scheduled up to a current MO and need to be fed back in the same feedback codebook.

In the embodiment, multiple PDSCHs scheduled by the type 1 DCI correspond to only one feedback bit. In this case, the terminal bundles the multiple PDSCHs scheduled by the type 1 DCI, that is, and a union of receiving results is taken so that a final feedback bit value is obtained. For example, the UE successfully receives all PDSCHs scheduled by the type 1 DCI, that is, feedback information about each PDSCH is 1 (that is, an acknowledgment character (ACK)), and a final feedback bit is also 1 (that is, the ACK). If at least one of the multiple PDSCHs scheduled by the type 1 DCI is not successfully received, a value of corresponding feedback information about the PDSCH which is not successfully received is 0 (that is, a negative acknowledgment (NACK)), and a final feedback bit value is 0 (that is, the NACK). In this case, the base station will assume that none of the PDSCHs scheduled by this type 1 DCI are successfully received.

In an implementation, a method for determining a feedback timing reference position is described in this embodiment. In the preceding embodiment, feedback information about the multiple PDSCHs scheduled by the type 1 DCI is multiplexed in the same feedback codebook. That is, each PDSCH needs a uniform feedback timing reference position, that is, a uniform position corresponding to K1 being equal to 0 is determined. K1 is an offset between a slot where a PDSCH is located and a feedback slot of the PDSCH. Thus, a value of K1 configured in the type 1 DCI can be shared.

In the embodiment, the position (that is, the feedback timing reference position) in response to K being equal to 0 may be determined in any one of manners described below.

Figure 11:
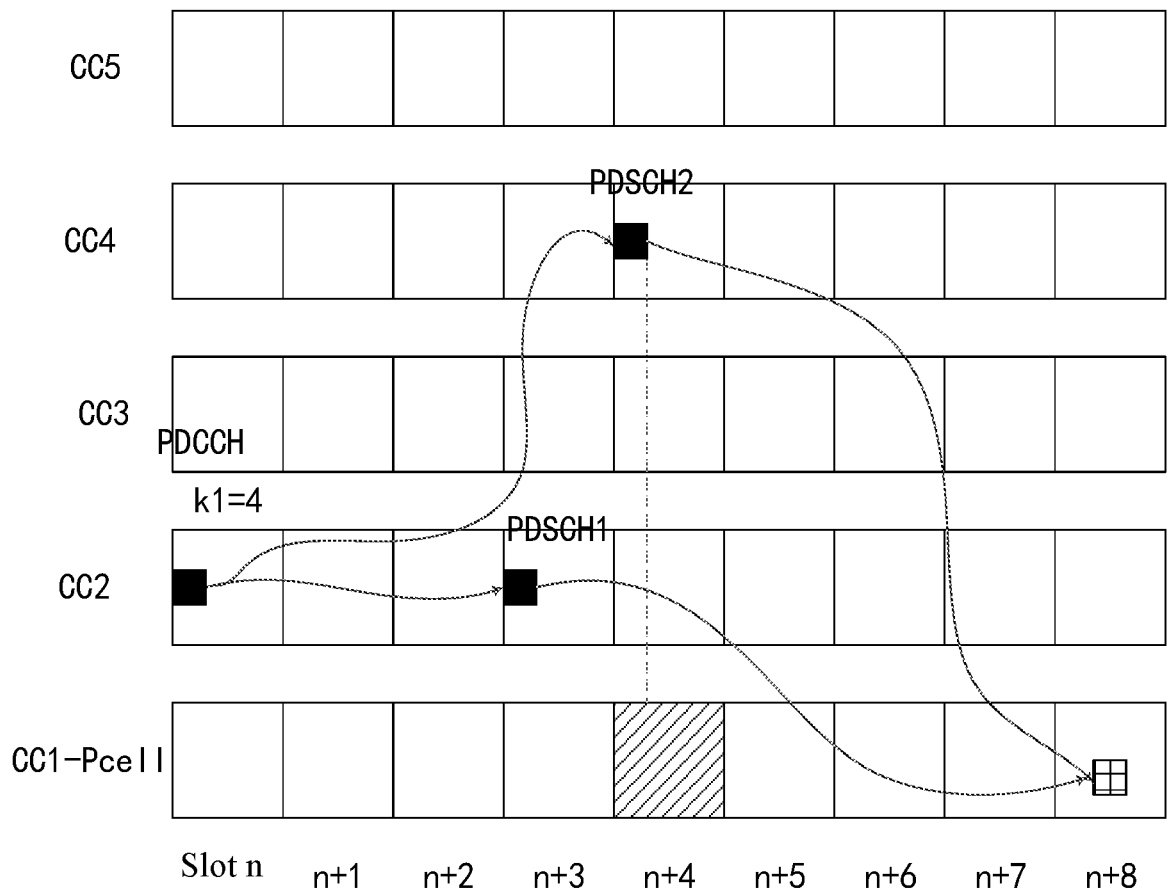
FIG. 11 is a schematic diagram illustrating determination of a feedback timing reference position according to an embodiment of the present application.

Manner one: FIG. 11 is a schematic diagram illustrating determination of the feedback timing reference position according to an embodiment of the present application; as shown in FIG. 11, the position corresponding to K1 being equal to 0 is determined using a PDSCH having a latest ending position as a reference; and that is, the end position of the PDSCH which ends the latest corresponds to a slot on a feedback CC, and the slot is the position corresponding to K1 being equal to 0.

Manner two: the position corresponding to K1 being equal to 0 is determined using a PDSCH having an earliest ending position as a reference; and that is, the end position of the PDSCH which ends the earliest corresponds to a slot on a feedback CC, and the slot is the position corresponding to K1 being equal to 0.

Manner three: the position corresponding to K1 being equal to 0 is determined using a PDSCH with a lowest CC index as a reference; and that is, an end position of the PDSCH with the lowest CC index corresponds to a slot on a feedback CC, and the slot is the position corresponding to K1 being equal to 0.

Manner four: the position corresponding to K1 being equal to 0 is determined using a PDSCH with a highest CC index as a reference; and that is, an end position of the PDSCH with the highest CC index corresponds to a slot on a feedback CC, and the slot is the position corresponding to K1 being equal to 0.

In the manner shown in FIG. 11, after the position (slot n+4) corresponding to K1 being equal to 0 is determined, in conjunction with the value of K1, that is, K1=4, indicated in the type 1 DCI, the feedback slot is determined to be slot n+8, where slot n+4+4=slot n+8.

Figure 12:
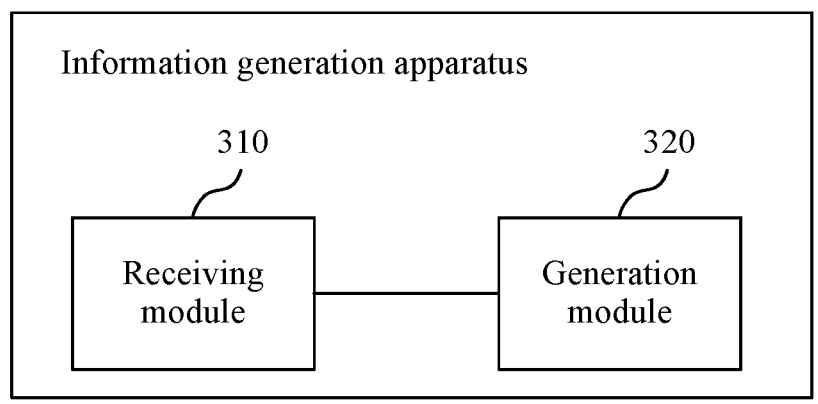
FIG. 12 is a block diagram illustrating a structure of an information generation apparatus according to an embodiment of the present application.

In an embodiment, FIG. 12 is a block diagram illustrating a structure of an information generation apparatus according to an embodiment of the present application. This embodiment is applied to a first communication node. As shown in FIG. 12, this embodiment includes a receiving module 310 and a generation module 320.

The receiving module 310 is configured to receive a downlink control information (DCI) sent by a second communication node, where the DCI is used for scheduling at least one physical downlink shared channel (PDSCH).

The generation module 320 is configured to generate a corresponding feedback codebook according to a counter downlink assignment index (C-DAI) value and a total downlink assignment index (T-DAI) value which are contained in a downlink assignment index (DAI) indicator field in the DCI.

The information generation apparatus provided by this embodiment is configured to implement the information generation method which is in the embodiment shown in FIG. 1 and applied to the first communication node, and the information generation apparatus provided by this embodiment has a similar implementation principle and technical effect. The details are not repeated here.

In an embodiment, in the case where the DCI is the first-type DCI and only one group of C-DAI values and T-DAI values are contained in the first-type DCI, a C-DAI value counting rule includes that a carrier where one of PDSCHs scheduled by the first-type DCI is located is used as a reference carrier and counting is performed according to the number of the PDSCHs scheduled by the first-type DCI, where the first-type DCI is used for scheduling at least two PDSCHs.

In an embodiment, the reference carrier is a carrier with a highest carrier index or a lowest carrier index among carriers where all PDSCHs scheduled by the first-type DCI are located.

In an embodiment, in the case where the DCI is the first-type DCI and the only one group of C-DAI values and T-DAI values are contained in the first-type DCI, the at least two PDSCHs scheduled by the first-type DCI are located on different time domain resources of the same carrier.

In an embodiment, in the case where the DCI is the first-type DCI and the one of the PDSCHs scheduled by the first-type DCI is located in a carrier with a lowest carrier index or a highest carrier index among carriers where PDSCHs scheduled by all DCI in the current monitoring occasion (MO) are located, a C-DAI value and a T-DAI value corresponding to the PDSCH are not contained in the first-type DCI.

In an embodiment, the C-DAI value corresponding to the PDSCH is determined in at least one of manners described below.

The C-DAI value corresponding to the PDSCH is the T-DAI value in the DCI in the current MO.

Alternatively, the C-DAI value corresponding to the PDSCH is a sum of a T-DAI value in the DCI in a previous MO and 1.

The T-DAI value corresponding to the PDSCH is the T-DAI value in the DCI in the current MO.

In the embodiment, in the case where the DCI is the first-type DCI and the at least two PDSCHs scheduled by the first-type DCI share the one group of C-DAI values and T-DAI values, the C-DAI value in the first-type DCI is determined according to the one of the PDSCHs scheduled by the first-type DCI, and other PDSCHs scheduled by the first-type DCI share the C-DAI value.

In an embodiment, in the case where the DCI is the first-type DCI and at least two groups of C-DAI values and T-DAI values are contained in the first-type DCI, each of the at least two groups of C-DAI values and T-DAI values separately corresponds to one of the PDSCHs scheduled by the first-type DCI.

In an embodiment, the counting is performed independently for the first-type DCI and the second-type DCI separately, where the second-type DCI is used for scheduling one PDSCH.

In an embodiment, in the case where the DCI is the first-type DCI and the one group of C-DAI values and T-DAI values are contained in the first-type DCI, the carrier where the one of the PDSCHs scheduled by the first-type DCI is located is used as the reference carrier for the C-DAI value, and one DAI value is accumulated for each first-type DCI.

In an embodiment, in the case where the DCI is the first-type DCI and the only one group of C-DAI values and T-DAI values are contained in the first-type DCI, feedback bits of all the PDSCHs scheduled by the first-type DCI occupy consecutive bits in the feedback codebook, and all the PDSCHs scheduled by the first-type DCI are sorted according to a preset order and are in one-to-one correspondence with the consecutive bits from front to back.

In an embodiment, the preset order includes one of orders described below.

All the PDSCHs are sorted from low to high according to indexes of carriers where all the PDSCHs are located, and PDSCHS with the same carrier index are sorted from front to back according to time domain positions where the PDSCHS are located.

Alternatively, all the PDSCHs are sorted from front to back according to time domain positions, and PDSCHs having the same time domain position are sorted from low to high according to indexes of carriers where the PDSCHs are located.

The time domain positions of all the PDSCHs are starting positions of all the PDSCHs in the time domain or ending positions of all the PDSCHs in the time domain.

In an embodiment, in the case where the DCI is the first-type DCI and the one of the PDSCHs scheduled by the first-type DCI is located in the carrier with the lowest carrier index or the highest carrier index among the carriers where the PDSCHs scheduled by all the DCIs in the current MO are located, feedback information about the PDSCH scheduled by the first-type DCI is fixed at a first bit or a last bit of feedback information of the current MO.

In an embodiment, in the case where the DCI is the first-type DCI and the at least two groups of C-DAI values and T-DAI values are contained in the first-type DCI, the one of all the PDSCHs scheduled by the first-type DCI and the PDSCH scheduled by the second-type DCI are counted together and contained in the same sub-codebook.

All the PDSCHs scheduled by the first-type DCI except the one PDSCH counted together with the PDSCH scheduled by the second-type DCI are counted together through an i-th PDSCH scheduled by the first-type DCI so that an i-th sub-codebook is generated, where $1 \leq i \leq N$.

The corresponding feedback codebook is generated using the same sub-codebook and N sub-codebooks in the manner of bit concatenation.

In an embodiment, each DAI count value in the first-type DCI corresponds to X bits in the feedback codebook, where X is related to the number of the PDSCHs scheduled by the first-type DCI.

In an embodiment, X is equal to the number of the PDSCHs scheduled by the first-type DCI.

Alternatively, in the case where each first-type DCI schedules an unequal number of PDSCHs, X is equal to a largest number of PDSCHs scheduled by a first-type DCI.

In an embodiment, in the case where the DCI is the first-type DCI and all the PDSCHs scheduled by the first-type DCI correspond to one feedback bit, feedback information about all PDSCHs scheduled by each first-type DCI is bundled in a preset bundling rule so that the one feedback bit is obtained.

In an embodiment, in the case where the DCI is the first-type DCI, the information generation apparatus further includes a determination module which is configured to determine a feedback timing reference position which corresponds to the feedback codebook.

In an embodiment, the feedback timing reference position which corresponds to the feedback codebook is determined in one of manners described below.

The feedback timing reference position is determined using a PDSCH having a latest ending position among all the PDSCHs scheduled by the first-type DCI as a reference.

The feedback timing reference position is determined using a PDSCH having an earliest ending position among all the PDSCHs scheduled by the first-type DCI as a reference.

The feedback timing reference position is determined using a PDSCH with a lowest carrier index among all the PDSCHs scheduled by the first-type DCI as a reference.

The feedback timing reference position is determined using a PDSCH with a highest carrier index among all the PDSCHs scheduled by the first-type DCI as a reference.

In an embodiment, the feedback timing reference position refers to a slot position corresponding to K1 being equal to 0, where K1 denotes the number of offset slots between a slot where the PDSCH is located and a slot where feedback information corresponding to the PDSCH is located.

Figure 13:
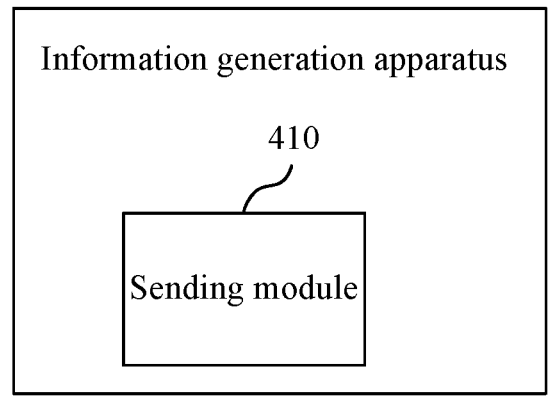
FIG. 13 is a block diagram illustrating a structure of another information generation apparatus according to an embodiment of the present application.

In an embodiment, FIG. 13 is a block diagram illustrating a structure of another information generation apparatus according to an embodiment of the present application. This embodiment is applied to a second communication node. As shown in FIG. 13, this embodiment includes a sending module 410.

The sending module 410 is configured to send a downlink control information (DCI) to a first communication node, where the DCI is used for scheduling at least one physical downlink shared channel (PDSCH).

The DCI is further used for causing the first communication node to generate a corresponding feedback codebook according to a counter downlink assignment index (C-DAI) value and a total downlink assignment index (T-DAI) value which are contained in a downlink assignment index (DAI) indicator field in the DCI.

The information generation apparatus provided by this embodiment is configured to implement the information generation method which is in the embodiment shown in FIG. 2 and applied to the second communication node, and the information generation apparatus provided by this embodiment has a similar implementation principle and technical effect. The details are not repeated here.

Figure 14:
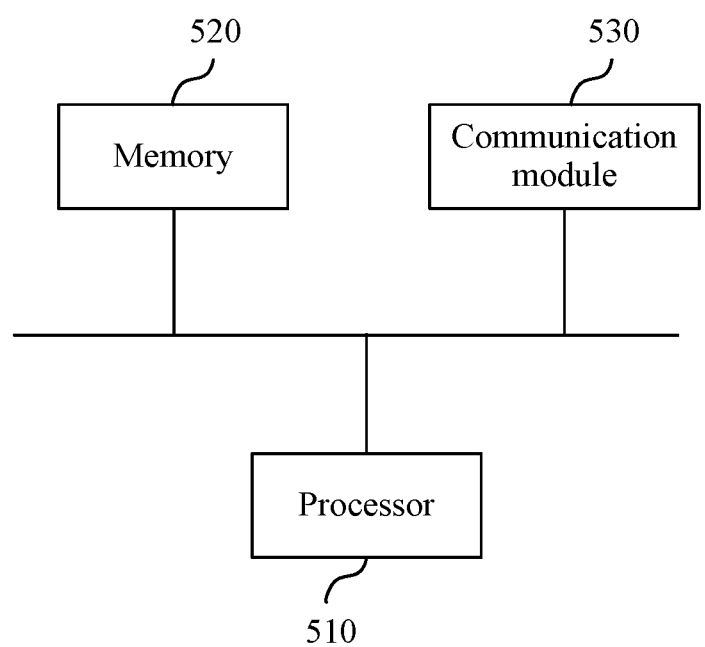
FIG. 14 is a structural diagram of a device according to an embodiment of the present application.

FIG. 14 is a structural diagram of a device according to an embodiment of the present application. As shown in FIG. 14, the device provided by the present application includes a processor 510, a memory 520, and a communication module 530. The number of processors 510 in the device may be one or more, and one processor 510 is used as an example in FIG. 14. The number of memories 520 in the device may be one or more, and one memory 520 is used as an example in FIG. 14. The processor 510, the memory 520, and the communication module 530 of the device may be connected through a bus or in other manners, and the connection through the bus is used as an example in FIG. 14. In the embodiment, the device is a first communication node.

The memory 520, as a computer-readable storage medium, may be configured to store software programs and computer-executable programs, and modules such as program instructions/modules (such as a receiving module and a generation module in an information generation apparatus) corresponding to the device in any embodiment of the present application. The memory 520 may include a program storage region and a data storage region, where the program storage region may store an operating system and an application program required for at least one function, and the data storage region may store data or the like created according to on the use of the device. In addition, the memory 520 may include a high-speed random-access memory and may also include a non-volatile memory such as at least one magnetic disk memory, flash memory, or other non-volatile solid-state memory. In some examples, the memory 520 may further include memories located remotely relative to the processor 510, and these remote memories may be connected to the device through a network. The examples of the preceding network include, but are not limited to, the Internet, an intranet, a local area network, a mobile communication network, and a combination thereof.

The communication module 530 is configured to perform a communicative connection between the first communication node and a second communication node so as to perform data communication and signal communication.

The device provided above may be configured to execute the information generation method applied to the first communication node provided by any embodiment described above, and has corresponding functions and effects.

In the case where the device is the second communication node, the device provided above may be configured to execute the information generation method applied to the second communication node provided by any embodiment described above, and has corresponding functions and effects.

An embodiment of the present application further provides a storage medium including computer-executable instructions for performing an information generation method applied to the first communication node when executed by a computer processor. The method includes: receiving downlink control information (DCI) sent by the second communication node, where the DCI is used for scheduling at least one physical downlink shared channel (PDSCH); and generating a corresponding feedback codebook according to a counter downlink assignment index (C-DAI) value and a total downlink assignment index (T-DAI) value which are contained in a downlink assignment index (DAI) indicator field in the DCI.

An embodiment of the present application further provides a storage medium including computer-executable instructions for performing an information generation method applied to the second communication node when executed by a computer processor. The method includes sending downlink control information (DCI) to the first communication node, where the DCI is used for scheduling at least one physical downlink shared channel (PDSCH). The DCI is further used for causing the first communication node to generate a corresponding feedback codebook according to a counter downlink assignment index (C-DAI) value and a total downlink assignment index (T-DAI) value which are contained in a downlink assignment index (DAI) indicator field in DCI.

It is to be understood by those skilled in the art that the term user equipment encompasses any suitable type of wireless user equipment, such as mobile phones, portable data processing devices, portable web browsers, or vehicle-mounted mobile stations.

Generally, various embodiments of the present application may be implemented in hardware, a dedicated circuit, software, logics, or any combination thereof. For example, some aspects may be implemented in hardware while other aspects may be implemented in firmware or software executable by a controller, a microprocessor, or other computing devices, although the present application is not limited thereto.

The embodiments of the present application may be implemented through the execution of computer program instructions by a data processor of a mobile device, for example, implemented in a processor entity, hardware, or a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, or may represent interconnected logic circuits, modules, and functions, or may represent a combination of program steps and logic circuits, modules and functions. Computer programs may be stored on a memory. The memory may be of any type suitable for a local technical environment and may be implemented using any suitable data storage technology such as, but not limited to, a read-only memory (ROM), a random access memory (RAM), an optical memory device and system (digital video disc (DVD) or compact disc (CD)), and the like. Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on multi-core processor architecture.

What is claimed is:

1. An information generation method, the method being applied to a first communication node and comprising:
   receiving a downlink control information (DCI) sent by a second communication node, wherein the DCI is used for scheduling at least one physical downlink shared channel (PDSCH); and
   generating a corresponding feedback codebook according to a counter downlink assignment index (C-DAI) value and a total downlink assignment index (T-DAI) value which are contained in a downlink assignment index (DAI) indicator field in the DCI;
   wherein in a case where the DCI is a first-type DCI and at least two PDSCHs scheduled by the first-type DCI share the C-DAI value and the T-DAI value, the C-DAI value in the first-type DCI is determined according to one PDSCH among PDSCHs scheduled by the first-type DCI.

2. The method according to claim 1, wherein the DCI comprises the first-type DCI and a second-type DCI, and counting is performed independently for the first-type DCI and the second-type DCI separately, wherein the second-type DCI is used for scheduling one PDSCH.

3. The method according to claim 1, wherein one group of C-DAI values and T-DAI values comprises the C-DAI value and the T-DAI value, and in a case where the DCI is the first-type DCI and the one group of C-DAI values and T-DAI values are contained in the first-type DCI, a carrier where one PDSCH among PDSCHs scheduled by the first-type DCI is located is used as a reference carrier for a C-DAI value, and one DAI count value is accumulated for each first-type DCI.

4. The method according to claim 1, wherein one group of C-DAI values and T-DAI values comprises the C-DAI value and the T-DAI value, and in the case where the DCI is the first-type DCI and the one group of C-DAI values and T-DAI values are contained in the first-type DCI, feedback bits of all PDSCHs scheduled by the Page 3 of 10 first-type DCI occupy consecutive bits in the feedback codebook, and all the PDSCHs scheduled by the first-type DCI are sorted according to a preset order and are in one-to-one correspondence with the consecutive bits from front to back.

5. The method according to claim 4, wherein the preset order comprises one of the following:
   the PDSCHs are sorted from low to high according to indexes of carriers where the PDSCHs are located, and PDSCHs with a same carrier index are sorted from front to back according to time domain positions where the PDSCHS are located; or
   the PDSCHs are sorted from front to back according to time domain positions, and PDSCHs having a same time domain position are sorted from low to high according to indexes of carriers where the PDSCHs are located;
   wherein the time domain positions of the PDSCHs are starting positions of the PDSCHs in a time domain or ending positions of the PDSCHs in a time domain.

6. The method according to claim 1, wherein in a case where the DCI is the first-type DCI and one PDSCH among PDSCHs scheduled by the first-type DCI is located in a carrier with a lowest carrier index or a highest carrier index among carriers where PDSCHs scheduled by all DCIs in a current monitoring occasion (MO) are located, feedback information about the PDSCH scheduled by the first-type DCI is fixed at a first bit or a last bit of feedback information of the current MO.

7. The method according to claim 1, wherein one group of C-DAI values and T-DAI values comprises the C-DAI value and the T-DAI value, and in a case where the DCI comprises the first-type DCI and at least two groups of C-DAI values and T-DAI values are contained in the first-type DCI, one PDSCH among all PDSCHs scheduled by the first-type DCI and a PDSCH scheduled by a second-type DCI are counted together and contained in a same sub-codebook, wherein the second DCI is used for scheduling one PDSCH;
   all the PDSCHs scheduled by the first-type DCI except the one PDSCH counted together with the PDSCH scheduled by the second-type DCI are counted together through an i-th PDSCH scheduled by the first-type DCI to generate an i-th sub-codebook, wherein $1 \leq i \leq N$; and
   the corresponding feedback codebook is generated using the same sub-codebook and N sub-codebooks in a manner of bit concatenation.

8. The method according to claim 1, wherein each DAI count value in the first-type DCI corresponds to X bits in the feedback codebook, wherein X is related to a number of PDSCHs scheduled by the first-type DCI.

9. The method according to claim 8, wherein in a case where all first-type DCIs schedule an equal number of PDSCHs, X is equal to the number of PDSCHs scheduled by the first-type DCI; or
   in a case where each first-type DCI schedules an unequal number of PDSCHs, X is equal to a largest number of PDSCHs scheduled by the first-type DCI among numbers of PDSCHs scheduled by all first-type DCIs.

10. The method according to claim 1, wherein in a case where the DCI is the first-type DCI and all PDSCHs scheduled by the first-type DCI correspond to one feedback bit, feedback information about all PDSCHs scheduled by each first-type DCI is bundled in a preset bundling rule to obtain the one feedback bit.

11. The method according to claim 1, wherein the DCI is the first-type DCI, and the method further comprises determining a feedback timing reference position which corresponds to the feedback codebook.

12. The method according to claim 11, wherein determining the feedback timing reference position which corresponds to the feedback codebook comprises one of the following manners:
- determining the feedback timing reference position using a PDSCH having a latest ending position among all PDSCHs scheduled by the first-type DCI as a reference;
- determining the feedback timing reference position using a PDSCH having an earliest ending position among all PDSCHs scheduled by the first-type DCI as a reference;
- determining the feedback timing reference position using a PDSCH with a lowest carrier index among all PDSCHs scheduled by the first-type DCI as a reference; or
- determining the feedback timing reference position using a PDSCH with a highest carrier index among all PDSCHs scheduled by the first-type DCI as a reference.

13. The method according to claim 11, wherein the feedback timing reference position refers to a slot position corresponding to K1 being equal to 0, wherein K1 denotes a number of offset slots between a slot where the PDSCH is located and a slot where feedback information corresponding to the PDSCH is located.

14. An information generation method, the method being applied to a second communication node and comprising:
- sending a downlink control information (DCI) to a first communication node, wherein the DCI is used for scheduling at least one physical downlink shared channel (PDSCH); and the DCI is further used for causing the first communication node to generate a corresponding feedback codebook according to a counter downlink assignment index (C-DAI) value and a total downlink assignment index (T-DAI) value which are contained in a downlink assignment index (DAI) indicator field in the DCI;
- wherein in a case where the DCI is a first-type DCI and at least two PDSCHs scheduled by the first-type DCI share the C-DAI value and the T-DAI value, the C-DAI value in the first-type DCI is determined according to one PDSCH among PDSCHs scheduled by the first-type DCI.

15. A device, comprising a memory and at least one processor;
- wherein the memory is configured to store at least one program; and
- when executing the at least one program, the at least one processor implements the following steps:
- receiving a downlink control information (DCI) sent by a second communication node, wherein the DCI is used for scheduling at least one physical downlink shared channel (PDSCH); and
- generating a corresponding feedback codebook according to a counter downlink assignment index (C-DAI) value and a total downlink assignment index (T-DAI) value which are contained in a downlink assignment index (DAI) indicator field in the DCI;
- wherein in a case where the DCI is a first-type DCI and at least two PDSCHs scheduled by the first-type DCI share the C-DAI value and the T-DAI value, the C-DAI value in the first-type DCI is determined according to one PDSCH among PDSCHs scheduled by the first-type DCI.

16. A non-transitory storage medium for storing a computer program which, when executed by a processor, implements the method according to claim 1.

17. A device, comprising a memory and at least one processor;
- wherein the memory is configured to store at least one program; and
- when executing the at least one program, the at least one processor implements the method of claim 14.

18. The method according to claim 1, wherein the one PDSCH among PDSCHs scheduled by the first-type DCI is in a carrier with a highest carrier index or a lowest carrier index among carriers where all PDSCHs scheduled by the first-type DCI are located.

19. The method according to claim 14, wherein the one PDSCH among PDSCHs scheduled by the first-type DCI is in a carrier with a highest carrier index or a lowest carrier index among carriers where all PDSCHs scheduled by the first-type DCI are located.

* * * * *